(12) United States Patent
Joujiki et al.

(10) Patent No.: US 10,721,398 B2
(45) Date of Patent: Jul. 21, 2020

(54) IMAGING OPTICAL SYSTEM AND IMAGING APPARATUS

(71) Applicant: Tamron Co., Ltd., Saitama-shi (JP)

(72) Inventors: Koutarou Joujiki, Saitama (JP); Yasuhiko Obikane, Saitama (JP)

(73) Assignee: Tamron Co., Ltd., Saitama-shi (JP)

( * ) Notice: Subject to any disclaimer, the term of this patent is extended or adjusted under 35 U.S.C. 154(b) by 48 days.

(21) Appl. No.: 15/838,787

(22) Filed: Dec. 12, 2017

(65) Prior Publication Data

US 2018/0213151 A1  Jul. 26, 2018

(30) Foreign Application Priority Data

Jan. 26, 2017  (JP) ................... 2017-012124

(51) Int. Cl.

| H04N 5/232 | (2006.01) |
|---|---|
| G02B 23/26 | (2006.01) |
| G02B 13/18 | (2006.01) |
| G02B 7/02 | (2006.01) |
| G02B 17/02 | (2006.01) |
| H04N 5/225 | (2006.01) |
| G02B 9/62 | (2006.01) |
| G02B 13/00 | (2006.01) |

(52) U.S. Cl.
CPC ......... H04N 5/23238 (2013.01); G02B 7/02 (2013.01); G02B 7/028 (2013.01); G02B 9/62 (2013.01); G02B 13/0045 (2013.01); G02B 13/18 (2013.01); G02B 17/023 (2013.01); G02B 23/26 (2013.01); H04N 5/2253 (2013.01); H04N 5/2254 (2013.01)

(58) Field of Classification Search
CPC .......... G02B 13/18; G02B 7/02; G02B 17/02; G02B 17/023; G02B 9/62; G02B 23/26; G02B 7/028; G02B 13/0045; H04N 5/225; H04N 5/2254; H04N 5/23238; H04N 5/2253
USPC ......... 359/740, 713, 761, 752, 756
See application file for complete search history.

(56) References Cited

U.S. PATENT DOCUMENTS

| 9,103,962 B2* | 8/2015 | Liao ............... G02B 13/06 |
| 2015/0207998 A1* | 7/2015 | Lin ............... G02B 13/0045 348/148 |

FOREIGN PATENT DOCUMENTS

| JP | 2004354572 A | 12/2004 |
| JP | 2007155976 A | 6/2007 |
| JP | 2016133599 A | 7/2016 |

OTHER PUBLICATIONS

Sheng-Huei Derek Lu "Opti 521/421 Tutorial for Plastic Optical Materials", College of Optical Sciences, University of Arizona, Nov. 29, 2010 (Year: 2010).*

(Continued)

*Primary Examiner* — Jie Lei
(74) *Attorney, Agent, or Firm* — The Webb Law Firm

(57) ABSTRACT

An imaging optical system according to the present invention is the imaging optical system composed by arranging a front group, a stop, and a rear group in order from an object side, a lens arranged closest to the stop in the front group is a positive lens, a lens arranged closest to the stop in the rear group is also a positive lens, and specific conditional expressions are satisfied. In addition, an imaging apparatus according to the present invention includes the imaging optical system.

8 Claims, 18 Drawing Sheets

(56) References Cited

OTHER PUBLICATIONS

Bäumer et al. "Handbook of Plastic Optics," Wiley, 2005, https://wp.optics.arizona.edu/optomech/wp content/uploads/sites/53/2016/11/Synopsis_Ruiz_Liliana.pdf.
Cyclo Olefin Polymer data, Zeonex Corporation, pp. 1-14.
Materials data for S-BSM16, Ohara Corp.

* cited by examiner

[FIG. 1]
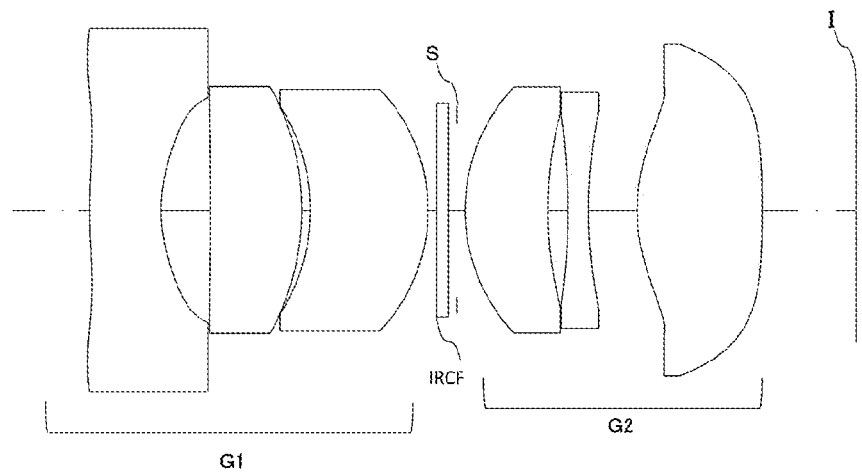
[FIG. 2]
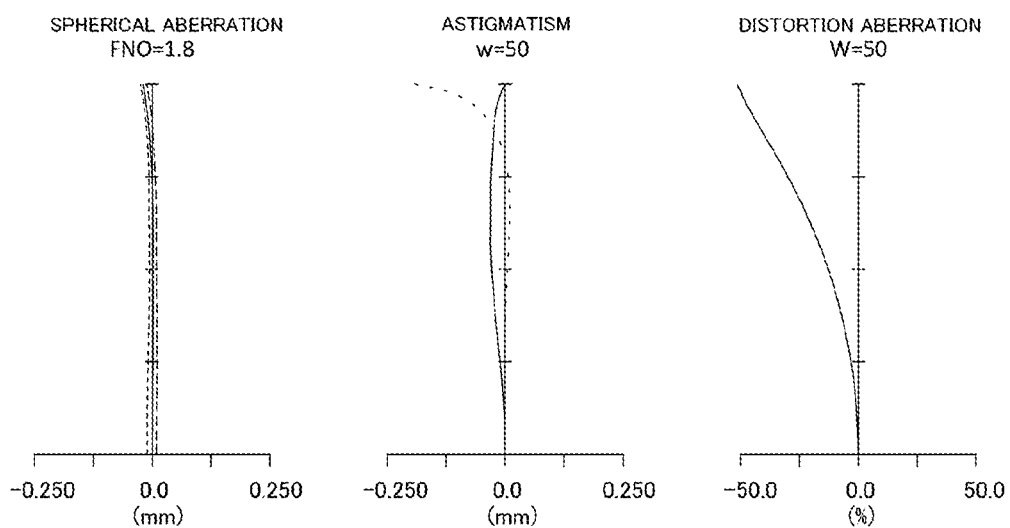

[FIG. 3]
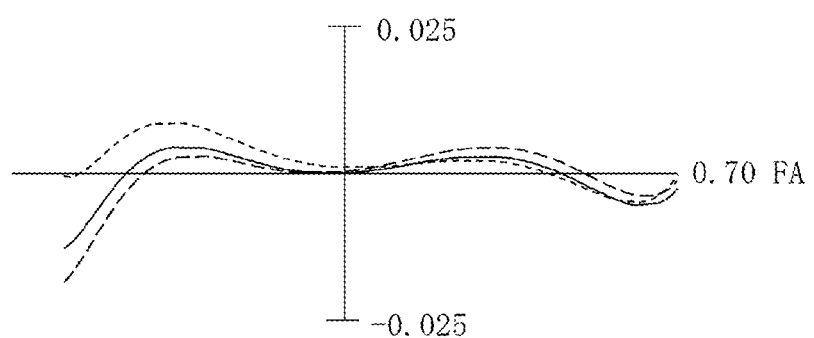
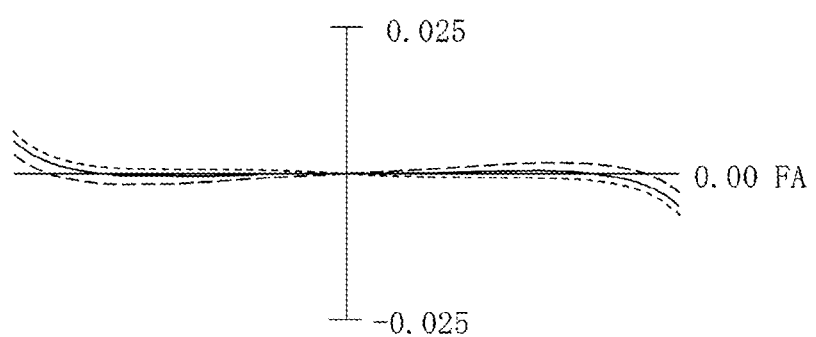

[FIG. 4]
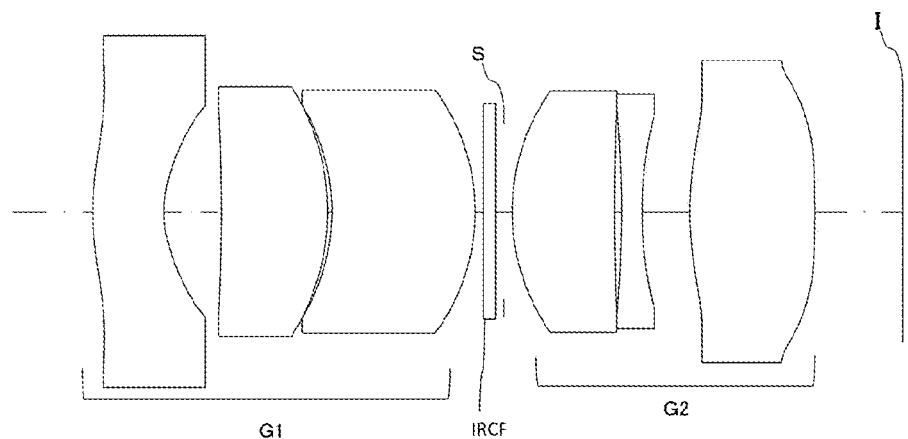
[FIG. 5]
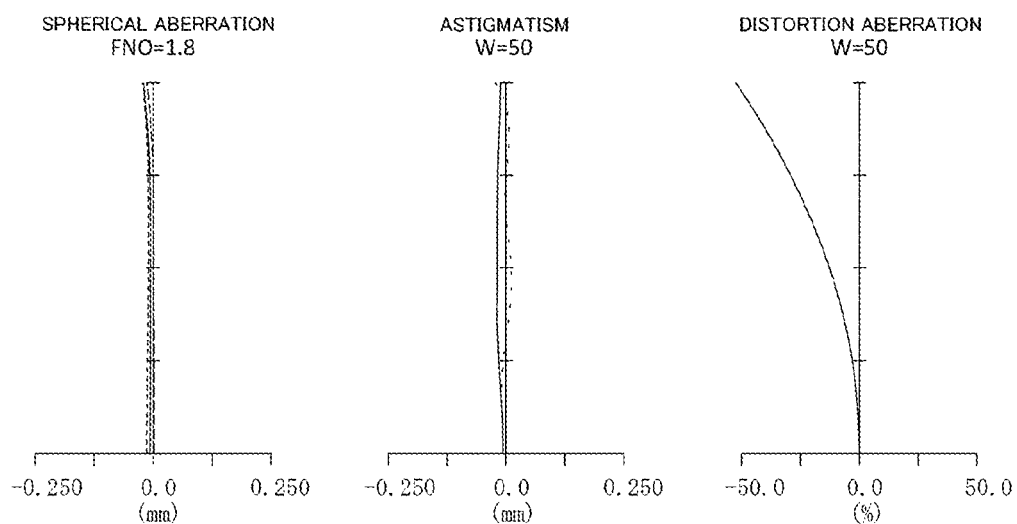

[FIG. 6]
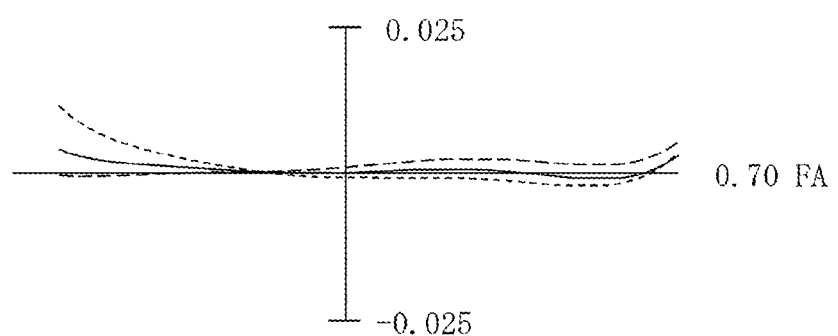
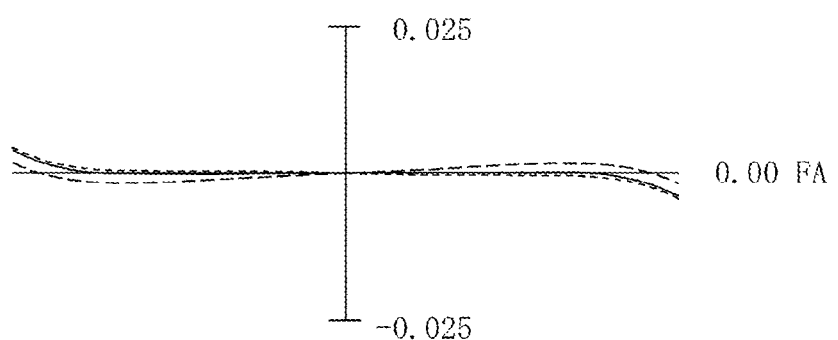

[FIG. 7]
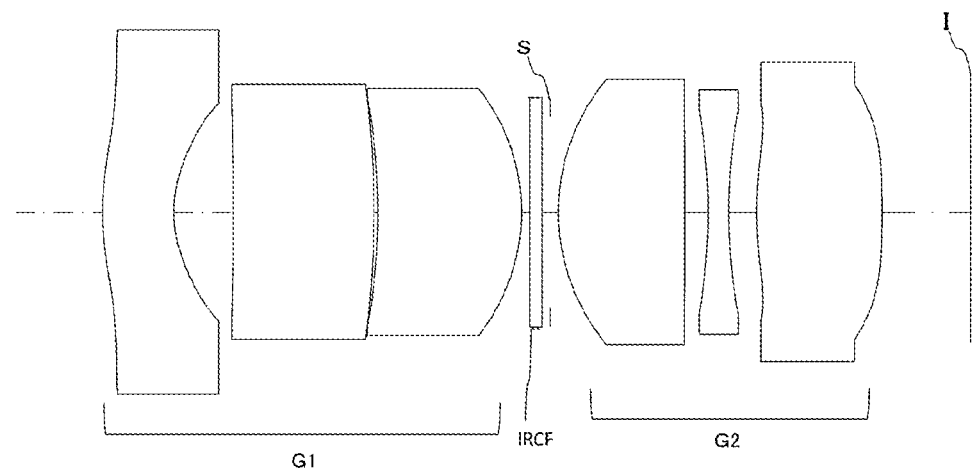
[FIG. 8]
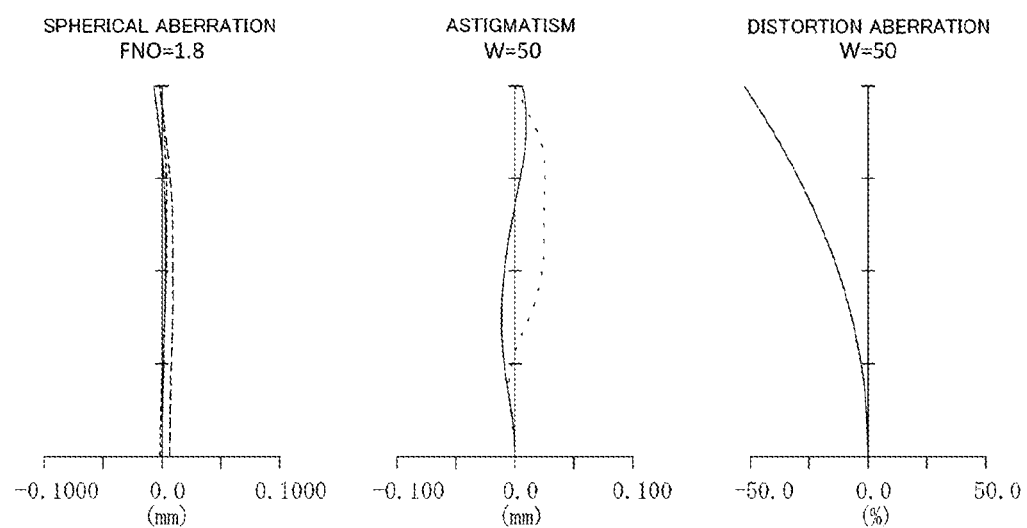

[FIG. 9]
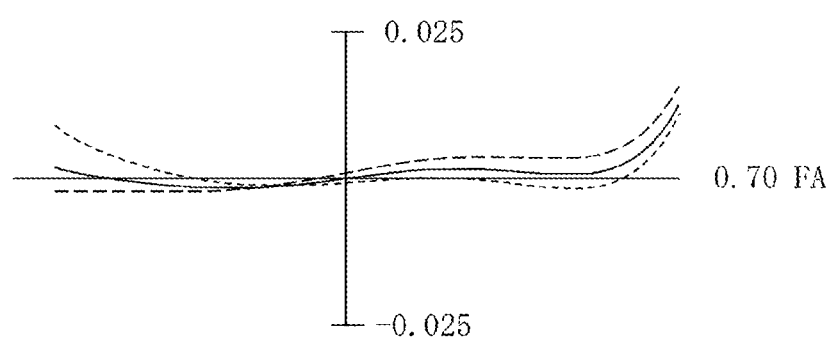
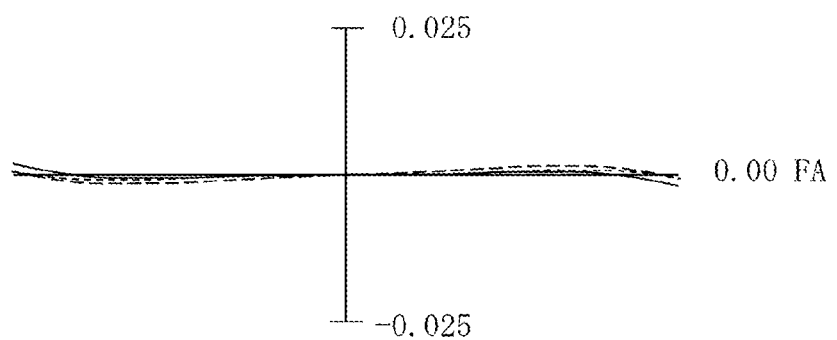

[FIG. 10]
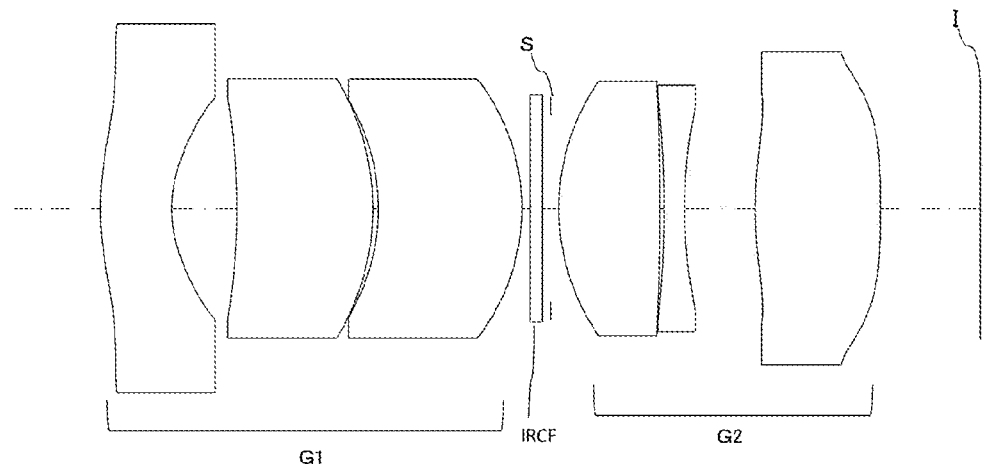
[FIG. 11]
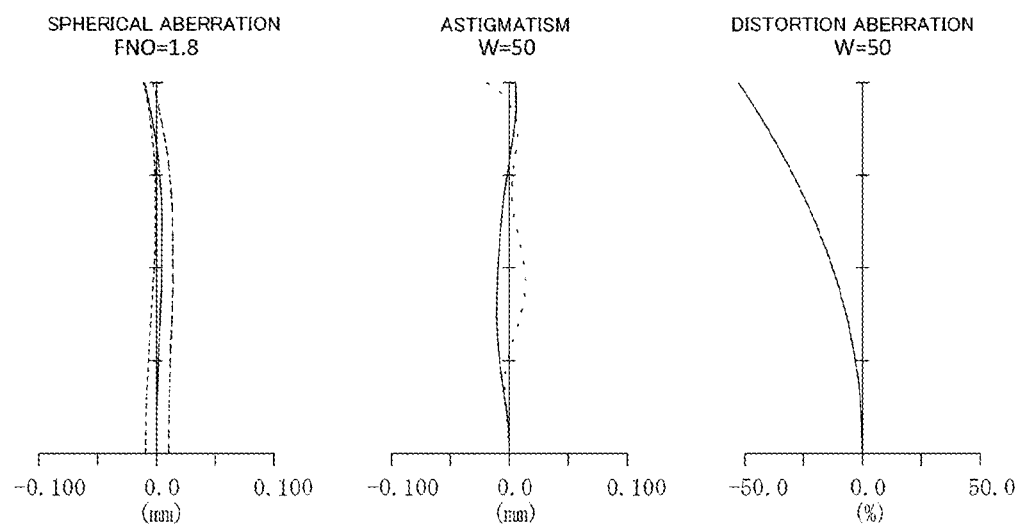

[FIG. 12]
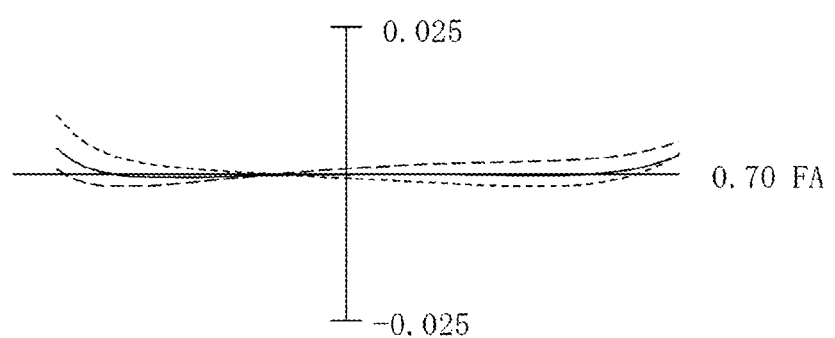
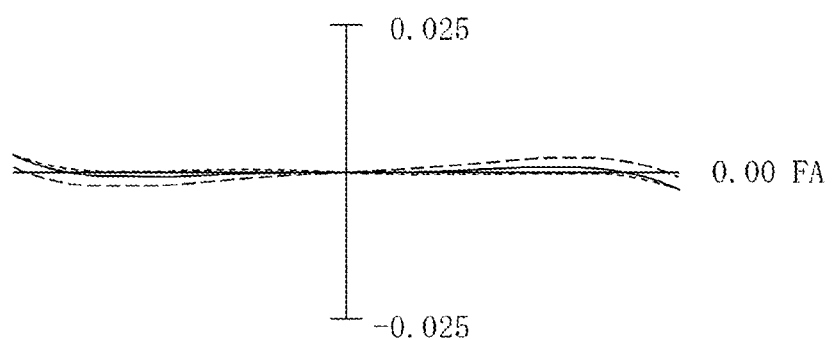

[FIG. 13]
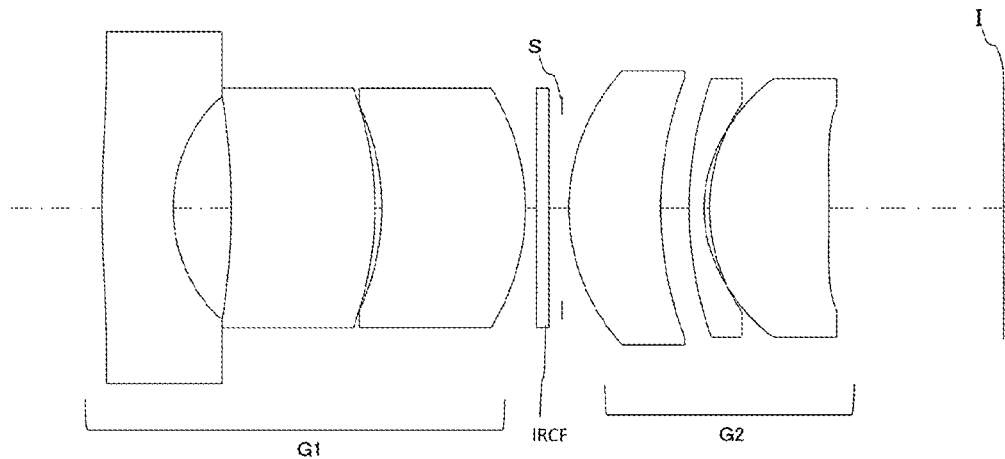
[FIG. 14]
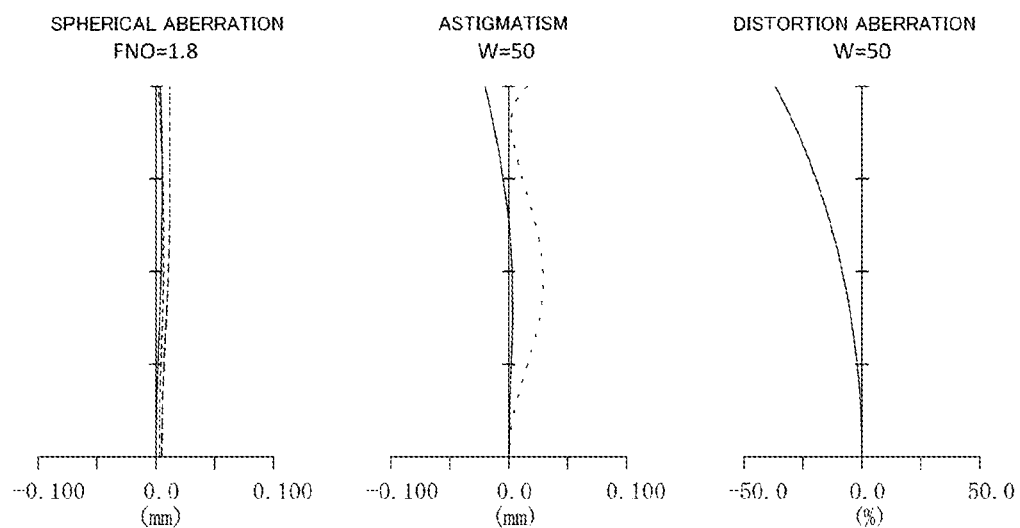

[FIG. 15]
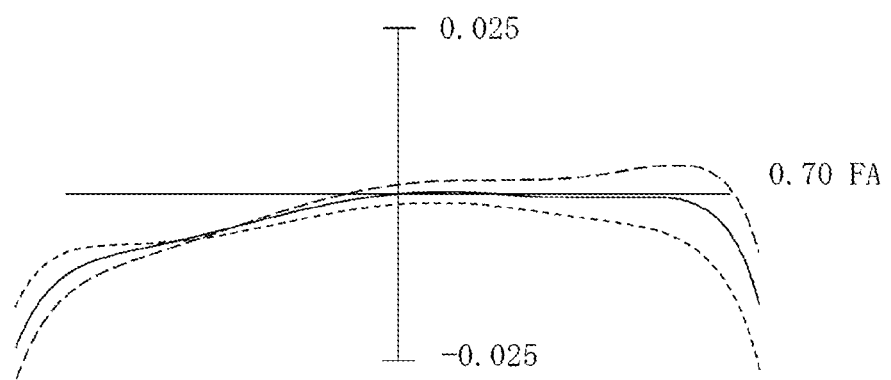
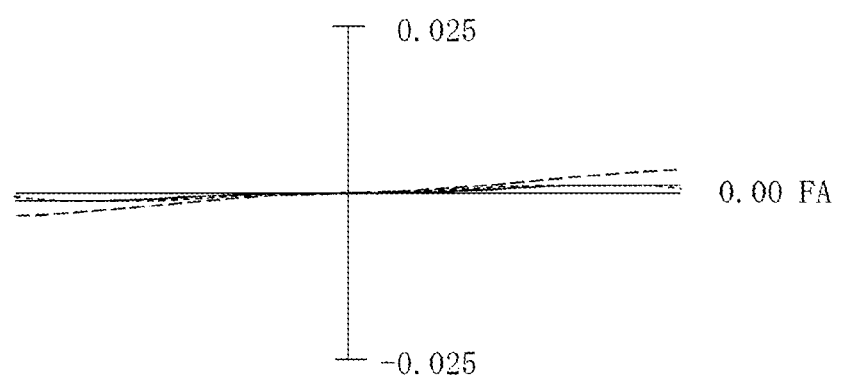

[FIG. 16]
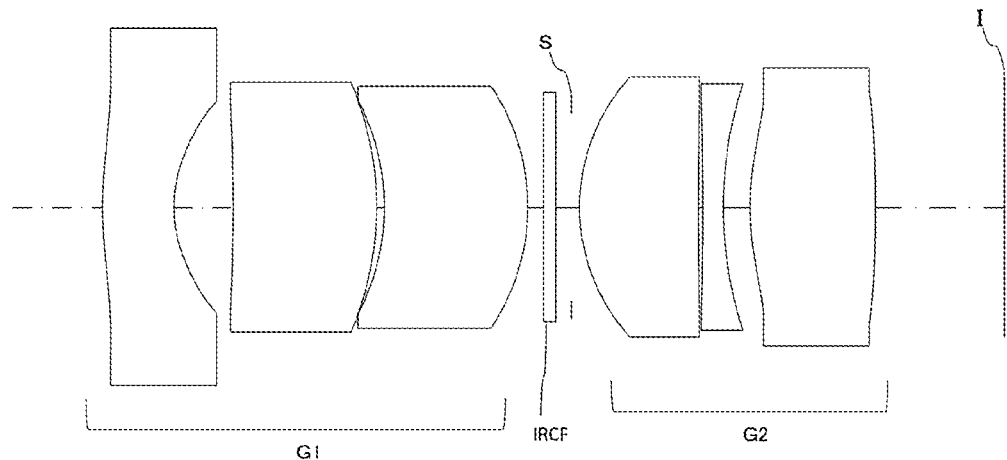
[FIG. 17]
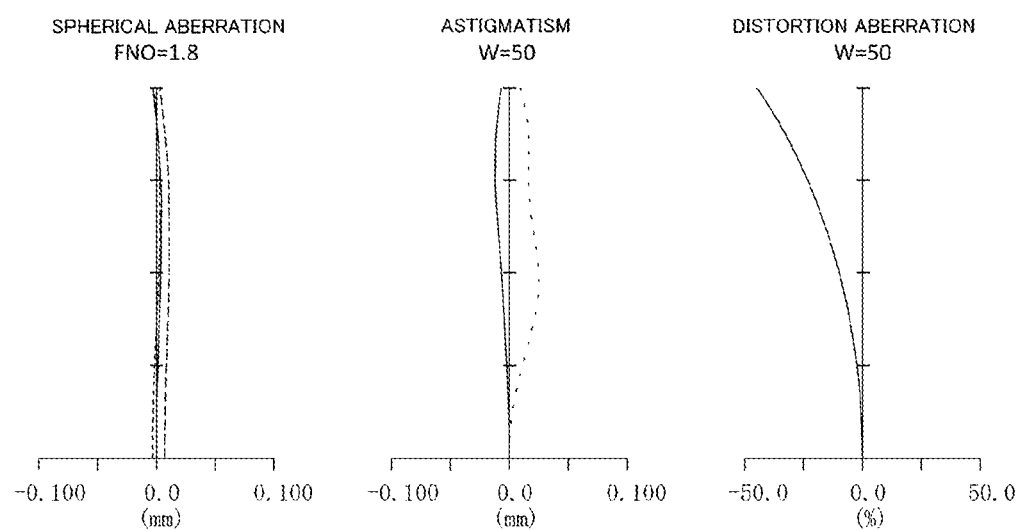

[FIG. 18]
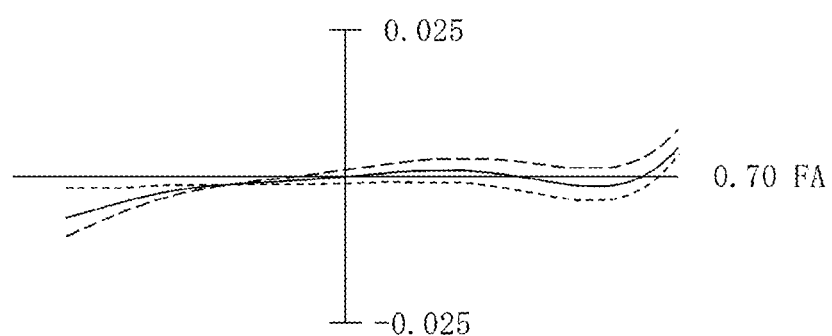
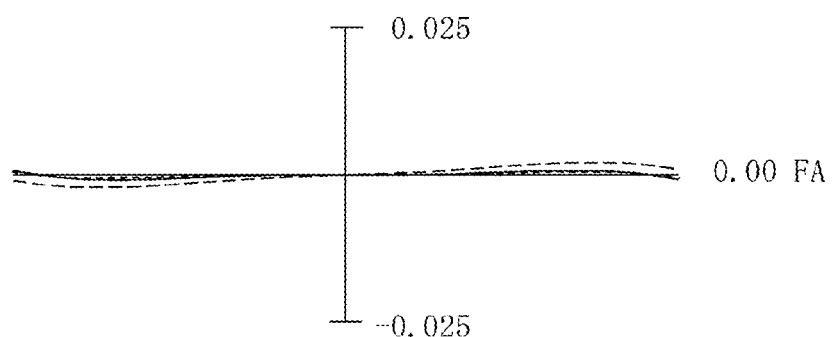

[FIG. 19]
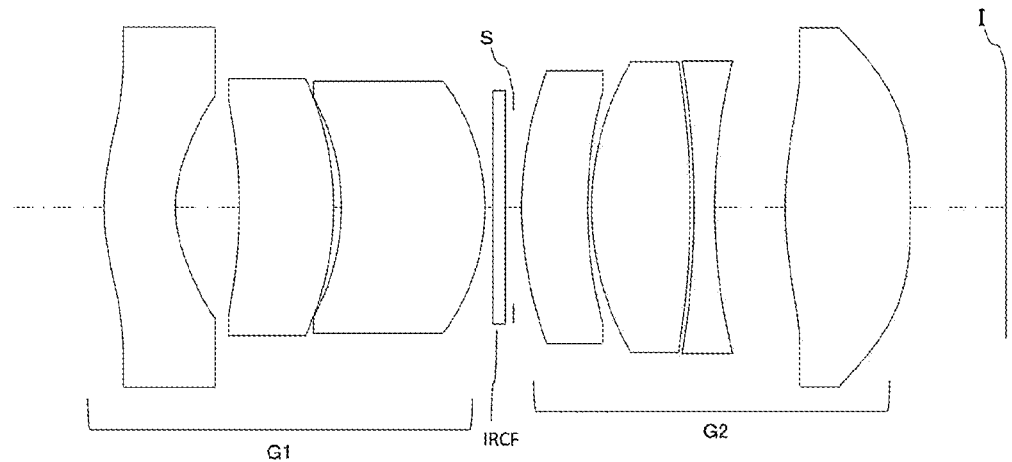
[FIG. 20]
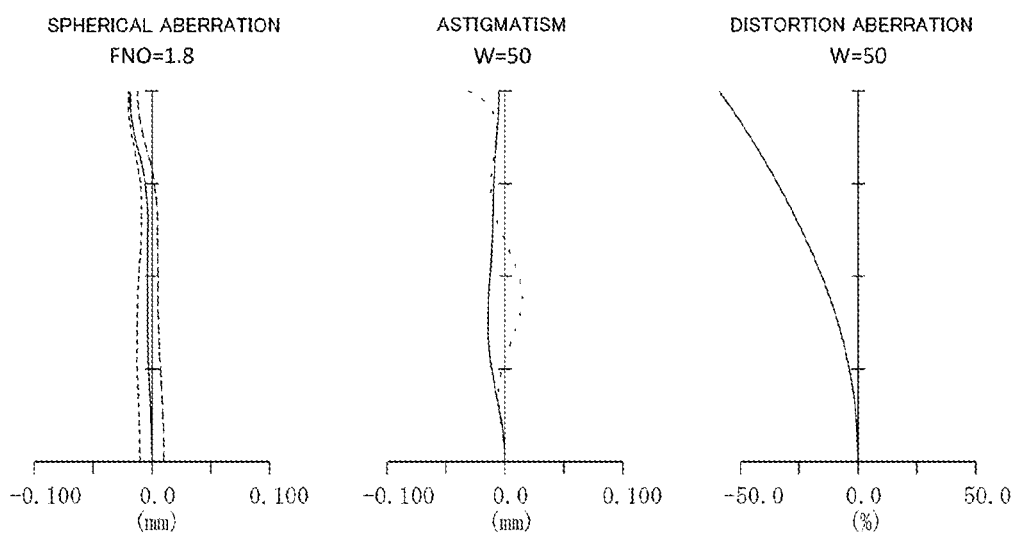

[FIG. 21]
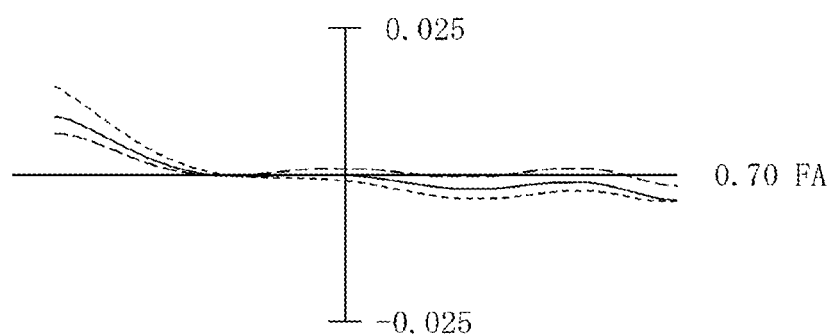
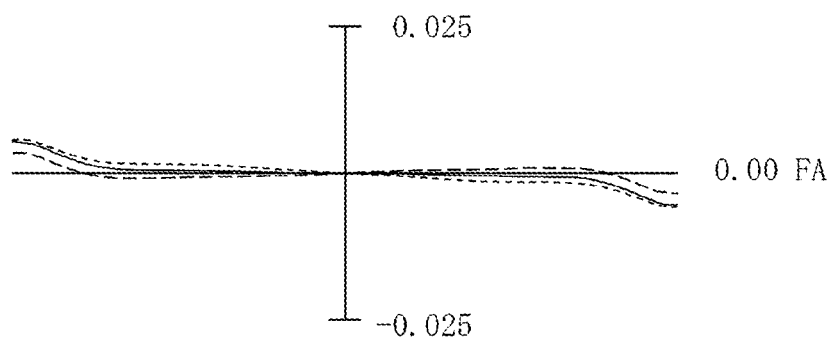

[FIG. 22]
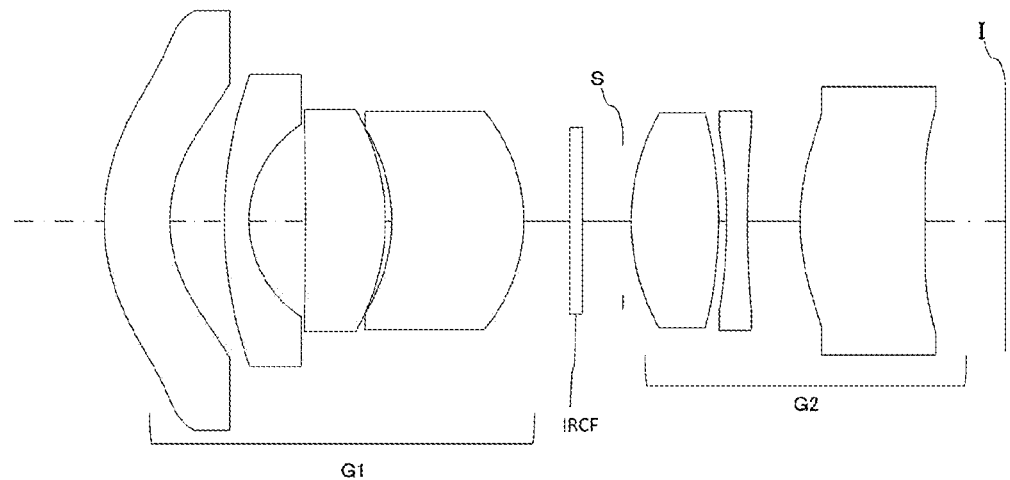
[FIG. 23]
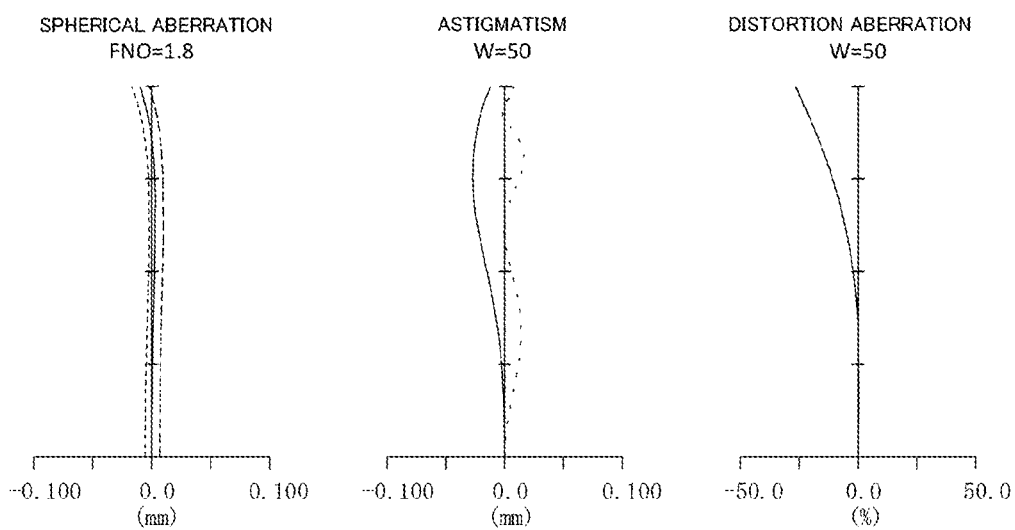

[FIG. 24]
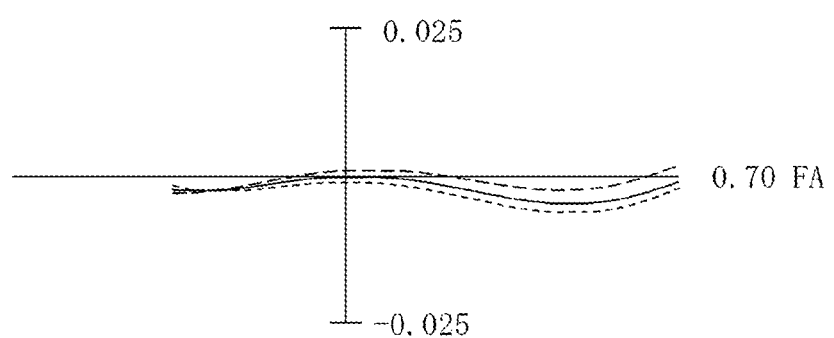
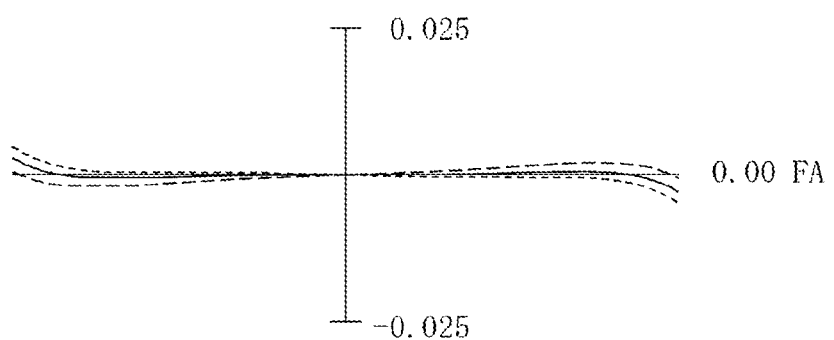

[FIG. 25]
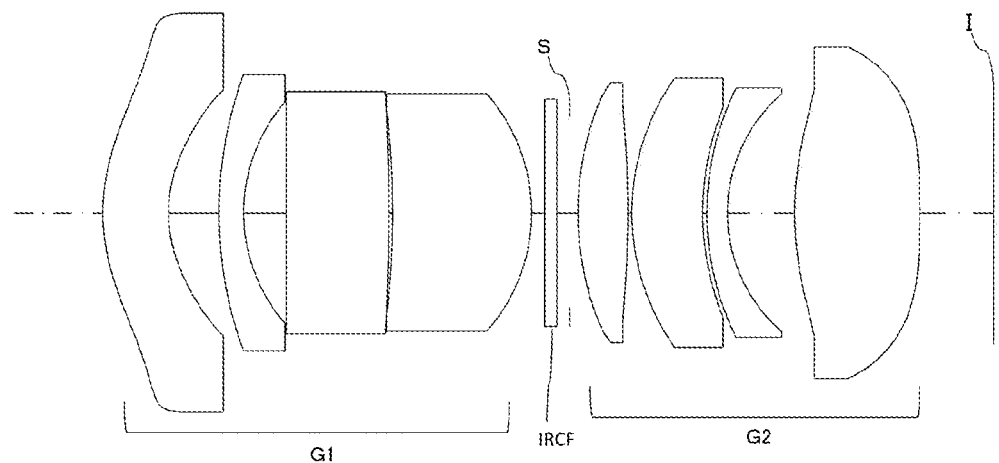
[FIG. 26]
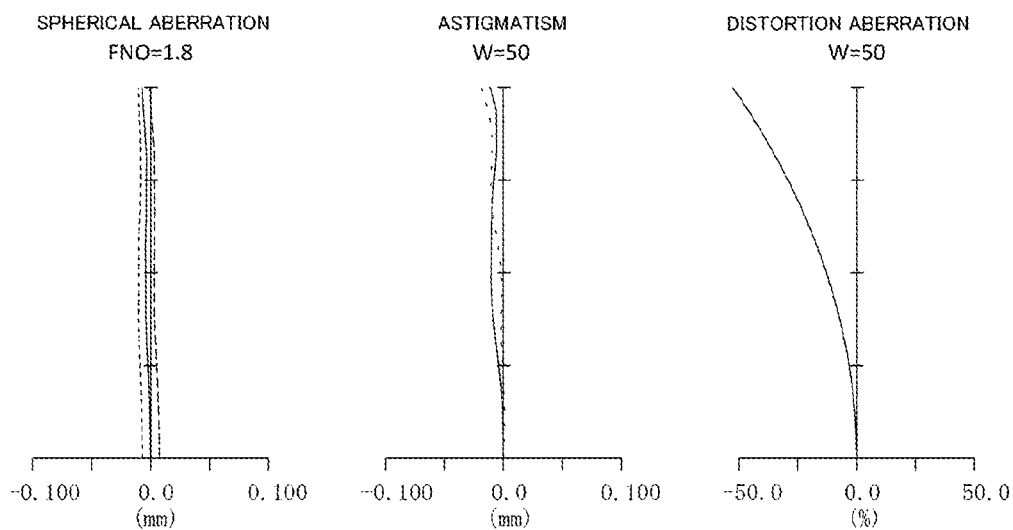

[FIG. 27]
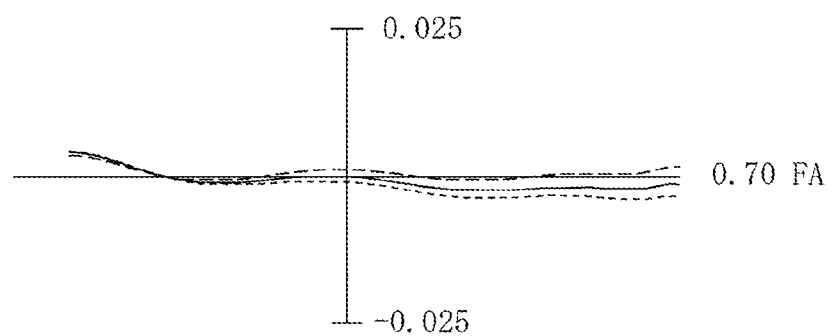
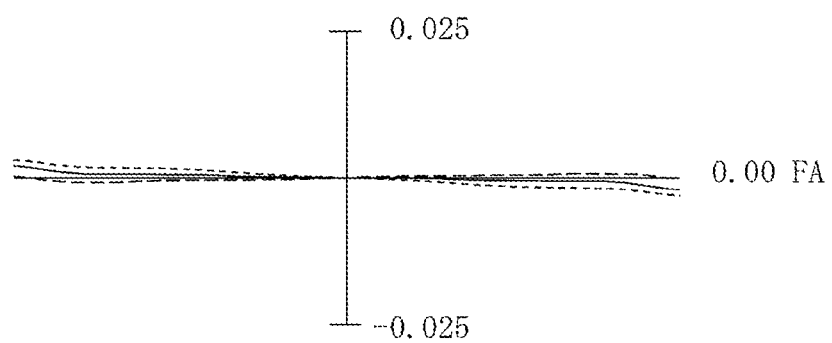

IMAGING OPTICAL SYSTEM AND IMAGING APPARATUS

CROSS-REFERENCE TO RELATED APPLICATION

This application claims priority to Japanese Patent Application No. 2017-012124 filed Jan. 26, 2017, the disclosure of which is hereby incorporated in its entirety by reference.

BACKGROUND OF THE INVENTION

Field of the Invention

The present invention relates to an imaging optical system and an imaging apparatus, and in particular relates to a wide-angle imaging optical system suitable for an imaging apparatus using a solid-state image sensor such as a CCD or a CMOS, and the imaging apparatus.

Description of the Related Art

Conventionally, a driving assist system that provides various kinds of driving assistance by mounting an imaging apparatus on a vehicle and making an image display device display an image acquired by the imaging apparatus is known. Examples of such driving assist systems include a back view monitor that makes the image display device display an image of a vehicle rear part and an around view monitor that makes the image display device display an image of the periphery of the vehicle from the point of view of looking down on the vehicle from above the vehicle. In addition, a drive recorder is also gaining popularity.

Furthermore, lately, various advanced driving assist systems such as a collision damage reducing brake system, a lane keep assist system, and an automatic inter-vehicle distance control system, which are utilizing an image sensing technology have been put into practical use aiming at realization of automatic driving. In the advanced driving assist system, based on image data acquired by the imaging apparatus, obstacles around a vehicle, lane position, inter-vehicle distances and the like are detected.

There are various demands for an imaging optical system of such an imaging apparatus. For example, as the number of pixels of a solid-state image sensor has been increased lately, a high-resolution bright optical system is demanded in an on-vehicle imaging apparatus.

In addition, in order to monitor surroundings of the vehicle by a smaller number of the imaging apparatuses, an optical system of a wide viewing angle is demanded. When a viewing angle is widened, relative illumination may decline. However, in order to realize the automatic driving, the image needs to be highly accurately recognized even in a peripheral part of the image. Therefore, the optical system of a wide angle without relative illumination decline at the peripheral part of the image is demanded.

Further, a using atmospheric temperature of the on-vehicle imaging apparatus greatly changes. For the imaging optical system of the on-vehicle imaging apparatus, a fixed focal focus lens for which a focus position is fixed is often used. In the case of the fixed focal focus lens, when a focus is shifted by the change of the using atmospheric temperature, image quality declines. Therefore, the imaging optical system capable of maintaining a high resolution even under a high temperature environment or under a low temperature environment is demanded.

Then, the imaging optical system of the on-vehicle imaging apparatus is demanded to be small-sized, light in weight and of a low cost while satisfying the various demands. Note that the problems are similar in the imaging optical system of an imaging apparatus for monitoring used outdoors or the like.

As the imaging optical system that can be used in such an on-vehicle imaging apparatus or the like, for example, optical systems disclosed in Patent Literature 1 (Japanese Patent Application, Japanese Patent Laid-Open No. 2016-133599), Patent Literature 2 (Japanese Patent Application, Japanese Patent Laid-Open No. 2007-155976) and Patent Literature 3 (Japanese Patent Application, Japanese Patent Laid-Open No. 2004-354572) are known. In the optical systems disclosed in Patent Literature 1 to Patent Literature 3, by adopting an orthographic projection system or increasing distortion at an image peripheral part furthermore, a bright optical system of a wide angle, for which relative illumination decline at an image periphery is suppressed is realized. Note that the distortion at the image peripheral part can be corrected by image processing.

However, in the optical system described in Patent Literature 1, an F-number is as small as 1.6 and the bright optical system is realized. However, the number of lenses is as large as seven, and miniaturization, weight reduction and cost reduction are not sufficient.

For the optical system described in Patent Literature 2, since the F-number is 2.8, further improved is demanded in terms of brightness. In addition, the number of lenses configuring the optical system is as large as nine, and the miniaturization, the weight reduction and the cost reduction are not sufficient.

In the optical system described in Patent Literature 3, the F-number is as small as 2.0 and the bright optical system is realized. In addition, the number of lenses is six, and the miniaturization and the weight reduction are performed. However, in the optical system, since a focus may be shifted accompanying the change of the atmospheric temperature, it is difficult to maintain an image forming performance at a room temperature at the time of a high temperature or a low temperature. The focus may be shifted similarly in the optical systems disclosed in Patent Literature 1 and Patent Literature 2.

An object of the present invention is to provide a small-sized imaging optical system of a wide angle and high relative illumination, capable of maintaining a high resolution regardless of change of an atmospheric temperature, and an imaging apparatus.

DISCLOSURE OF THE INVENTION

In order to solve the problem, the imaging optical system of the present invention is an imaging optical system formed by arranging a front group, a stop and a rear group in order from an object side, a lens arranged closest to the stop in the front group is a positive lens, a lens arranged closest to the stop in the rear group is also a positive lens, and a conditional expression (1) and a conditional expression (2) below are satisfied.

$$0.20 < |dn3/dn4| < 9.60 \tag{1}$$

$$0.52 < y/f \sin(\theta 1) < 1.35 \tag{2}$$

Note that, $dn3$: a temperature coefficient of a relative refractive index at a temperature 20° C.-40° C. to a d line of the positive lens arranged closest to the stop in the front group dn4: a temperature coefficient of a relative refractive index at the temperature 20° C.-40° C. to a d line of the positive lens arranged closest to the stop in the rear group f: a focal length of the imaging optical system y: a maximum image height of the imaging optical system, and θ1: a maximum half image viewing angle of the imaging optical system.

In addition, in order to solve the problem, the imaging apparatus according to the present invention includes the imaging optical system according to the present invention and an image sensor that converts an optical image formed by the imaging optical system to an electric signal on an image side of the imaging optical system.

Advantages of the Invention

According to the present invention, it is possible to provide a small-sized imaging optical system of a wide angle and high relative illumination, capable of maintaining a high resolution regardless of change of an atmospheric temperature, and an imaging apparatus.

BRIEF DESCRIPTION OF THE DRAWINGS

FIG. 1 is a sectional view illustrating a lens construction example at the time of focusing at infinity of an imaging optical system in an example 1 of the present invention;

FIG. 2 is a spherical aberration diagram, an astigmatism diagram, and a distortion aberration diagram at the time of focusing at infinity of the imaging optical system in the example 1;

FIG. 3 is a lateral aberration diagram at the time of focusing at infinity of the imaging optical system in the example 1;

FIG. 4 is a sectional view illustrating a lens construction example at the time of focusing at infinity of the imaging optical system in an example 2 of the present invention;

FIG. 5 is a spherical aberration diagram, an astigmatism diagram, and a distortion aberration diagram at the time of focusing at infinity of the imaging optical system in the example 2;

FIG. 6 is a lateral aberration diagram at the time of focusing at infinity of the imaging optical system in the example 2;

FIG. 7 is a sectional view illustrating a lens construction example at the time of focusing at infinity of the imaging optical system in an example 3 of the present invention;

FIG. 8 is a spherical aberration diagram, an astigmatism diagram, and a distortion aberration diagram at the time of focusing at infinity of the imaging optical system in the example 3;

FIG. 9 is a lateral aberration diagram at the time of focusing at infinity of the imaging optical system in the example 3;

FIG. 10 is a sectional view illustrating a lens construction example at the time of focusing at infinity of the imaging optical system in an example 4 of the present invention;

FIG. 11 is a spherical aberration diagram, an astigmatism diagram, and a distortion aberration diagram at the time of focusing at infinity of the imaging optical system in the example 4;

FIG. 12 is a lateral aberration diagram at the time of focusing at infinity of the imaging optical system in the example 4;

FIG. 13 is a sectional view illustrating a lens construction example at the time of focusing at infinity of the imaging optical system in an example 5 of the present invention;

FIG. 14 is a spherical aberration diagram, an astigmatism diagram, and a distortion aberration diagram at the time of focusing at infinity of the imaging optical system in the example 5;

FIG. 15 is a lateral aberration diagram at the time of focusing at infinity of the imaging optical system in the example 5;

FIG. 16 is a sectional view illustrating a lens construction example at the time of focusing at infinity of the imaging optical system in an example 6 of the present invention;

FIG. 17 is a spherical aberration diagram, an astigmatism diagram, and a distortion aberration diagram at the time of focusing at infinity of the imaging optical system in the example 6;

FIG. 18 is a lateral aberration diagram at the time of focusing at infinity of the imaging optical system in the example 6;

FIG. 19 is a sectional view illustrating a lens construction example at the time of focusing at infinity of the imaging optical system in an example 7 of the present invention;

FIG. 20 is a spherical aberration diagram, an astigmatism diagram, and a distortion aberration diagram at the time of focusing at infinity of the imaging optical system in the example 7;

FIG. 21 is a lateral aberration diagram at the time of focusing at infinity of the imaging optical system in the example 7;

FIG. 22 is a sectional view illustrating a lens construction example at the time of focusing at infinity of the imaging optical system in an example 8 of the present invention;

FIG. 23 is a spherical aberration diagram, an astigmatism diagram, and a distortion aberration diagram at the time of focusing at infinity of the imaging optical system in the example 8;

FIG. 24 is a lateral aberration diagram at the time of focusing at infinity of the imaging optical system in the example 8;

FIG. 25 is a sectional view illustrating a lens construction example at the time of focusing at infinity of the imaging optical system in an example 9 of the present invention;

FIG. 26 is a spherical aberration diagram, an astigmatism diagram, and a distortion aberration diagram at the time of focusing at infinity of the imaging optical system in the example 9; and FIG. 27 is a lateral aberration diagram at the time of focusing at infinity of the imaging optical system in the example 9.

DETAILED DESCRIPTION OF THE PREFERRED EMBODIMENTS

Hereinafter, embodiments of an imaging optical system and an imaging apparatus according to the present invention will be described. Note that the imaging optical system and the imaging apparatus described below are one aspect of the imaging optical system and the imaging apparatus according to the present invention, and the imaging optical system according to the present invention is not limited to the following aspect.

1. Imaging Optical System 1-1. Construction of Imaging Optical System

First, the embodiment of the imaging optical system according to the present invention will be described. The imaging optical system according to the present invention is an imaging optical system formed by arranging a front group, a stop and a rear group in order, a lens arranged closest to the stop in the front group is a positive lens, a lens arranged closest to the stop in the rear group is also a positive lens, and a conditional expression (1) and a conditional expression (2) to be described later are satisfied. In this way, by arranging positive lenses closest to the stop on an object side and an image plane side of the stop, spherical aberration can be excellently corrected, and the imaging optical system of a high resolution can be realized. Then, by satisfying the conditional expression (1) and the conditional expression (2) described below, a small-sized imaging optical system of a wide angle and high relative illumination, capable of maintaining a high resolution regardless of change of an atmospheric temperature can be provided. First, a construction of the optical system according to the present invention will be described and matters relating to the conditional expressions will be described later.

The imaging optical system according to the present invention is configured by a plurality of lenses. The front group is configured by lenses arranged more on the object side than the stop. The rear group is configured by lenses arranged more on the image plane side than the stop. For the front group and the rear group, as long as the lens arranged closest to the stop is the positive lens respectively, the specific lens construction is not limited in particular.

In addition, it is preferable that the lens on the most object side in the front group is a negative lens and the rear group has positive refractive power as a whole. By such a refractive power arrangement, it becomes easy to attain a so-called retrofocus type lens, it is effective when extending a back focus and facilitating lens barrel design, and it is also effective when performing various aberration corrections. In the case that the lens on the most object side is the negative lens, negative distortion increases easily at a peripheral part of an image plane, but it can be corrected by image processing. From a viewpoint of suppressing coma aberration, it is preferable that the image plane side of the positive lens arranged closes to the stop in the front group is convex to the image plane side, and from a viewpoint of suppressing the spherical aberration, it is preferable that the object side of the positive lens arranged closest to the stop in the rear group is convex to the object side. Hereinafter, preferable construction examples of the front group and the rear group will be described.

(1) Front Group

It is preferable that the front group includes a first lens and a second lens on the object side of the positive lens arranged closest to the stop, for example. It is preferable that the first lens is the negative lens, a surface of which on the object side is a convex surface and is also an aspherical surface that weakens convex power with distance from an optical axis. In addition, it is preferable that the second lens is the positive lens, the surface of which on the object side is a concave surface. At the time, it is assumed that the first lens is arranged more on the object side than the second lens.

By configuring the front group such, image distortion is suppressed and the high resolution can be achieved while increasing the relative illumination. In addition, by arranging the first lens which is the negative lens more on the object side than the second lens, it becomes easy to widen a viewing angle. By making the surface on the object side of the first lens a convex surface and an aspherical surface that weakens the convex power with distance from the optical axis, weakening of the refractive power at the peripheral part is suppressed, it becomes easier to widen the viewing angle, the distortion increases greatly, and the relative illumination can be increased more. Therefore, it becomes further easy to realize the optical system for which the entire image plane is bright.

In addition, by making the object side surface of the positive lens (second lens) arranged between the first lens and the positive lens arranged closest to the stop a concave surface, the coma aberration and the image distortion can be excellently corrected, and it becomes easy to realize the imaging optical system of the high resolution.

Note that, at least one positive or negative lens may be arranged between the first lens and the second lens, and at least one positive or negative lens may be arranged between the second lens and the positive lens arranged closest to the stop. By arranging the first lens and the second lens more on the object side than the positive lens arranged closest to the stop, the effects described above can be obtained.

From a viewpoint of planning for miniaturization, weight reduction and cost reduction of the imaging optical system according to the present invention, it is preferable that the number of the lenses configuring the front group is small, and it is more preferable that the front group is configured by four or fewer lenses. It is preferable that the front group is practically configured by three lenses that are the first lens which is the negative lens, the second lens which is the positive lens and a third lens which is the positive lens arranged closest to the stop in order from the object side, for example, in terms of planning for miniaturization, weight reduction and cost reduction of the imaging optical system according to the present invention while maintaining the high resolution.

(2) Rear Group

For the rear group, the specific lens construction is not limited in particular as long as the positive lens arranged closest to the stop is equipped. From the viewpoint of planning for miniaturization, weight reduction and cost reduction of the imaging optical system according to the present invention, it is preferable that the number of the lenses configuring the rear group is small, and it is more preferable that the rear group is configured by four or fewer lenses. At the time, by including at least one negative lens, aberration correction or the like can be excellently performed.

For example, it is the most preferable that the rear group is practically configured by three lenses that are a fourth lens which is the positive lens arranged closest to the stop, a fifth lens which is the negative lens, and a sixth lens which is the positive lens in order from the object side, in terms of planning for miniaturization, weight reduction and cost reduction of the imaging optical system according to the present invention while maintaining the high resolution.

When the number of the lenses configuring the imaging optical system becomes larger than six, it is advantageous in terms of obtaining the imaging optical system of the high resolution, but it becomes difficult to perform the miniaturization, the weight reduction and the cost reduction. When the number of the lenses becomes smaller than six, it becomes difficult to obtain the imaging optical system of the high resolution. In addition, it also becomes difficult to suppress focus shift accompanying the change of the atmospheric temperature so that it becomes difficult to realize the imaging optical system with an excellent temperature performance.

Note that a material of the lenses configuring the front group and the rear group is not limited in particular except for the positive lens arranged closest to the stop. However, from a viewpoint of suppressing the focus shift accompanying the change of the using atmospheric temperature, it is preferable that all the lenses configuring the front group and the rear group are made of glass.

1-2. Conditional Expression

Next, conditions that the imaging optical system should satisfy, or conditions to be preferably satisfied will be described.

The imaging optical system satisfies the conditional expression (1) and the conditional expression (2) below.

$$0.20<|dn3/dn4|<9.60 \quad (1)$$

$$0.52<y/f\cdot\sin(\theta 1)<1.35 \quad (2)$$

Note that, in the conditional expression (1) and the conditional expression (2) described above, dn3: a temperature coefficient of a relative refractive index at a temperature 20° C.-40° C. to a d line of the positive lens arranged closest to the stop in the front group dn4: a temperature coefficient of a relative refractive index at the temperature 20° C.-40° C. to a d line of the positive lens arranged closest to the stop in the rear group f: a focal length of the imaging optical system y: a maximum image height of the imaging optical system, and θ1: a maximum half image viewing angle of the imaging optical system.

Note that the maximum half image viewing angle of the imaging optical system corresponds to a main light beam incident angle from the object side corresponding to the maximum image height of the imaging optical system.

1-2-1. Conditional Expression (1)

When the using atmospheric temperature changes, the temperature coefficient of the relative refractive index of the lens arranged closest to the stop respectively in the front group and the rear group tends to affect the focus shift (the change of a focus position). Therefore, by making the lens arranged closest to the stop respectively in the front group and the rear group out of a material that satisfies the conditional expression (1), the focus shift is suppressed even when the using atmospheric temperature changes, and the high resolution equal to that under a room temperature can be maintained even under a high temperature environment or under a low temperature environment.

When a value of the conditional expression (1) becomes a lower limit or smaller, the temperature coefficient of the relative refractive index within the above-described temperature range to the d line of a glass material of the positive lens arranged closest to the stop in the rear group becomes too large, the focus shift under the high temperature environment or under the low temperature environment becomes large, and the resolution declines. In addition, when the value of the conditional expression (1) becomes an upper limit value or larger, the temperature coefficient of the relative refractive index within the above-described temperature range to the d line of the glass material of the positive lens arranged closest to the stop in the rear group becomes too small, and also in this case, the focus shift under the high temperature environment or under the low temperature environment becomes large, and the resolution declines.

When obtaining the effects, it is preferable that the lower limit value of the conditional expression (1) is 0.60, it is more preferable to be 1.00, and it is further preferable to be 1.40. In addition, it is preferable that the upper limit value of the conditional expression (1) is 9.30, it is more preferable to be 8.50, and it is further preferable to be 6.20.

1-2-2. Conditional Expression (2)

The conditional expression (2) is a condition for widening the viewing angle of the imaging optical system, and increasing the relative illumination while generating the distortion for the orthographic projection system or more. When a numerical value of the conditional expression (2) becomes the lower limit value or smaller, since the distortion becomes too large, it becomes difficult to electronically process obtained image data and sufficiently correct the distortion. In addition, when the numerical value of the conditional expression (2) becomes the upper limit value or larger, in addition to a fact that the viewing angle of the imaging optical system becomes small, the distortion also becomes small, and the relative illumination declines.

When obtaining the effects, it is preferable that the lower limit value of the conditional expression (2) is 0.58, it is more preferable to be 0.64, and it is further preferable to be 0.70. In addition, it is preferable that the upper limit value of the conditional expression (2) is 1.28, it is more preferable to be 1.20, and it is further preferable to be 1.12.

1-2-3. Condition Expression (3) and Conditional Expression (4)

It is preferable that the imaging optical system according to the present invention satisfies the conditional expression (3) and the conditional expression (4), in the case that the front group includes at least one positive lens in addition to the positive lens arranged closest to the stop. The conditional expression (3) and the conditional expression (4) are the expressions that respectively define an Abbe constant of the positive lens of a smallest Abbe constant to the d line, among the positive lenses included in the front group, and an Abbe constant of the positive lens of a largest Abbe constant to the d line, among the positive lenses included in the front group.

$$\nu 2<47 \quad (3)$$

$$\nu 3>65 \quad (4)$$

Note that

ν2: the Abbe constant of the positive lens of the smallest Abbe constant to the d line, among the positive lenses included in the front group, and ν3: the Abbe constant of the positive lens of the largest Abbe constant to the d line, among the positive lenses included in the front group.

By configuring the front group to include the positive lens that satisfies the conditional expression (3) and the positive lens that satisfies the conditional expression (4), axial chromatic aberration can be excellently corrected, and the imaging optical system of the higher resolution can be obtained. In the case that the conditional expression (3) or the conditional expression (4) is not satisfied, it becomes difficult to excellently correct the axial chromatic aberration.

When obtaining the effects, it is preferable that the upper limit value of the conditional expression (3) is 45, it is more preferable to be 43, and it is further preferable to be 41. Note that, when it is the positive lens composed of the glass material, the Abbe constant of which is smaller than the upper limit value, on condition that the front group includes the positive lens composed of the glass material that satisfies the conditional expression (4), the above-described effects are obtained. Therefore, it is not needed to define the lower limit value of the conditional expression (3) in particular, but the lower limit value may be 10 or may be 16, for example.

Similarly, when obtaining the effects, it is preferable that the lower limit value of the conditional expression (4) is 67, it is more preferable to be 69, and it is further preferable to be 71. In addition, similarly to the case of the conditional expression (3), when it is the positive lens composed of the glass material, the Abbe constant of which is larger than the lower limit value, on condition that the front group includes the positive lens composed of the glass material that satisfies the conditional expression (3), the above-described effects are obtained. Therefore, it is not needed to define the upper limit value of the conditional expression (4) in particular, but the upper limit value may be 100 or may be 96, for example.

1-2-4. Conditional Expression (5)

It is preferable that the imaging optical system according to the present invention satisfies the conditional expression (5), in the case that the front group includes at least one positive lens in addition to the positive lens arranged closest to the stop. The conditional expression (5) is the expression that respectively defines the refractive index of the positive lens of a largest refractive index to the d line, among the positive lenses included in the front group, and a refractive index of the positive lens of a smallest refractive index to the d line, among the positive lenses included in the front group.

$$0.15 < N2 - N3 \quad (5)$$

Note that

N2: the refractive index of the positive lens of the largest refractive index to the d line, among the positive lenses included in the front group, and N3: the refractive index of the positive lens of the smallest refractive index to the d line, among the positive lenses included in the front group.

At the time of the construction that the front group includes two or more positive lenses, by satisfying the conditional expression (5), the spherical aberration can be excellently corrected, and the imaging optical system of the higher resolution can be obtained. When the numerical value of the conditional expression (5) becomes the lower limit value or smaller, the refractive index of the positive lens of the largest refractive index to the d line among the positive lenses included in the front group becomes too small, and a difference in a radius of curvature between the surface on the object side of the positive lens and the surface on an image side becomes large. Therefore, a refractive angle of a light beam made incident on a peripheral edge part of the positive lens becomes large and the spherical aberration becomes large so that the resolution declines and it is not preferable.

When obtaining the effects, it is preferable that the lower limit value of the conditional expression (5) is 0.20, it is more preferable to be 0.22, and it is further preferable to be 0.24. When the numerical value of the conditional expression (5) is larger than the lower limit value, the effects can be obtained. Therefore, it is not needed to define the upper limit value in particular, but it may be 0.68, may be 0.52, or may be 0.45, for example.

Note that it is preferable that the positive lens of the smallest Abbe constant to the d line among the positive lenses included in the front group in the conditional expression (3) is the positive lens of the largest refractive index to the d line among the positive lenses included in the front group in the conditional expression (5). In addition, it is preferable that the positive lens of the largest Abbe constant to the d line among the positive lenses included in the front group in the conditional expression (4) is the positive lens of the smallest refractive index to the d line among the positive lenses included in the front group in the conditional expression (5).

1-2-5. Conditional Expression (6)

In the imaging optical system according to the present invention, in the case that the front group is configured including the first lens which is the negative lens, the second lens which is the positive lens and the third lens arranged closest to the stop in order from the object side, it is preferable to satisfy the conditional expression (6) below.

$$1.3 < |f12/f| < 9.5 \quad (6)$$

Note that f: the focal length of the imaging optical system, and f12: the focal length of the second lens.

In the case that the conditional expression (6) is satisfied, astigmatism and chromatic aberration of magnification can be excellently corrected, and the imaging optical system of the higher resolution can be obtained. When the numerical value of the conditional expression (6) becomes the lower limit value or smaller, since the refractive power of the second lens becomes too large, it becomes difficult to correct the astigmatism, and the resolution declines. On the other hand, when the numerical value of the conditional expression (6) becomes the upper limit value or larger, since the refractive power of the second lens becomes too small, it becomes difficult to correct the chromatic aberration of the magnification, and the resolution declines.

When obtaining the effects, it is preferable that the lower limit value of the conditional expression (6) is 1.4, and it is further preferable to be 1.5. In addition, it is preferable that the upper limit value of the conditional expression (6) is 6.2, it is more preferable to be 5.5, and it is further preferable to be 4.7.

1-2-6. Conditional Expression (7)

In the imaging optical system according to the present invention, in the case that the front group is configured including the first lens which is the negative lens, the second lens which is the positive lens and the third lens arranged closest to the stop in order from the object side, it is preferable to satisfy the conditional expression (7) below.

$$2.2 < |f13/f| < 8.9 \quad (7)$$

Note that f: the focal length of the imaging optical system, and f13: the focal length of the third lens.

In the case that the conditional expression (7) is satisfied, the spherical aberration and the coma aberration can be excellently corrected, and the imaging optical system of the higher resolution can be obtained. When the numerical value of the conditional expression (7) becomes the lower limit value or smaller, since the refractive power of the third lens becomes too large, it becomes difficult to correct the spherical aberration, and the resolution declines. On the other hand, when the numerical value of the conditional expression (7) becomes the upper limit value or larger, since the refractive power of the third lens becomes too small, it becomes difficult to correct the coma aberration, and the resolution declines.

When obtaining the effects, it is preferable that the lower limit value of the conditional expression (7) is 3.1, and it is further preferable to be 4.2. In addition, it is preferable that the upper limit value of the conditional expression (7) is 7.8, and it is further preferable to be 7.5.

2. Imaging Apparatus

Next, the imaging apparatus according to the present invention will be described. The imaging apparatus according to the present invention includes the imaging optical system according to the present invention, and an image sensor that converts an optical image formed by the imaging optical system to an electric signal, on the image plane side of the imaging optical system.

In the present invention, the image sensor or the like is not limited in particular, and a solid-state image sensor or the like such as a CCD (Charge Coupled Device) sensor or a CMOS (Complementary Metal Oxide Semiconductor) sensor can be used. The image height and the resolution of the solid-state image sensor are not limited in particular, but it is preferable that they are as follows, for example.

In the imaging optical system according to the present invention, it is preferable that the image height of the image sensor is 5.5 mm or lower, it is more preferable to be 5.0 mm or lower, and it is further preferable to be 4.5 mm or lower. Note that, in the imaging optical system and the imaging apparatus according to the present invention, the image height of the image sensor is not limited in particular, the one of an appropriate size can be used according to the maximum image height of the imaging optical system, and the present invention is applicable even for the one for which the image height of the image sensor is higher than 5.5 mm.

In addition, in the imaging optical system according to the present invention, it is preferable that a pixel pitch of the image sensor is 2.0 μm or longer, and it is more preferable to be 2.2 μm or longer. Note that, in the imaging optical system and the imaging apparatus according to the present invention, the pixel pitch of the image sensor is not limited in particular, and the present invention is applicable even for the one for which the pixel pitch of the image sensor is shorter than 2.0 μm.

Since the imaging optical system according to the present invention described above can realize the high resolution, it is suitable for the solid-state image sensor as described above. In addition, for the imaging apparatus according to the present invention, since the viewing angle is wide, the relative illumination is large, and the high resolution can be maintained regardless of the change of the atmospheric temperature, it is suitable for the imaging apparatus of an installation type installed to a moving body such as a vehicle or a structure or the like indoors and outdoors and used at all times, such as an on-vehicle imaging apparatus provided in various kinds of driving assist systems, or the imaging apparatus for monitoring.

Next, the present invention will be specifically described by illustrating embodiments. Note that the present invention is not limited to the following examples. The optical system in each example listed below is the imaging optical system used in the imaging apparatus (optical device) described above, and is preferably applicable to the imaging apparatus of an installation type, such as the on-vehicle imaging apparatus, in particular. In addition, in each lens sectional view, a left side facing the drawing is the object side, and a right side is the image plane side.

Example 1

(1) Construction of Optical System

FIG. 1 illustrates a lens construction at the time of focusing at infinity of the imaging optical system in the example 1 of the present invention.

The imaging optical system in the example 1 is composed by arranging a front group G1, a stop (aperture stop) S, and a rear group G2 in order, and forms an object image on an image plane I of the image sensor such as the CCD sensor or the CMOS sensor. Note that, in FIG. 1, "IRCF" is an infrared ray cutoff filter. Since the points are similar in the respective lens sectional views illustrated in the other examples, description is omitted below.

The imaging optical system is practically configured by six lenses. Specifically, the front group is configured by the first lens which is the negative lens, the second lens which is the positive lens and the third lens which is the positive lens arranged closest to the stop S in order from the object side. In addition, the rear group is configured by the fourth lens which is the positive lens arranged closest to the stop S, the fifth lens which is the negative lens, and the sixth lens which is the positive lens in order from the object side.

For the first lens, the surface on the object side is the convex surface and the aspherical surface that weakens the convex power with distance from the optical axis. In addition, for the second lens, the surface on the object side is the concave surface. Details of the surface shapes can be seen in Table 1 and Table 2.

(2) Typical Numerical Values

Next, typical numerical values to which specific numerical values of the imaging optical system are applied will be described. Surface data of the imaging optical system is illustrated in Table 1. In Table 1, "NS" is an order of a lens surface counted from the object side, that is, a surface number, "R" illustrates a radius of curvature of the lens surface, "D" illustrates an interval on the optical axis of the lens surface, "Nd" illustrates the refractive index to the d line (wavelength λ=587.56 nm), and "Vd" illustrates the Abbe constant to the d line. In addition, an asterisk "*" attached next to the surface number illustrates that the lens surface is the aspherical surface. In addition, "INF" described in a column of "R" means "∞ (infinity)".

Table 2 illustrates aspherical surface data. The aspherical surface data indicates a constant of the cone and Aspheric coefficients of respective orders when the aspherical surface is defined by the following expression.

$$X = \frac{H^2/R}{1+\sqrt{1-(\varepsilon H^2/R^2)}} + \qquad \text{[Formula 1]}$$

$$AH^2 + BH^4 + CH^6 + DH^8 + EH^{10} + FH^{12}$$

Note that X is an aspherical surface shape sag amount from an optical axis surface top (a direction of an image plane is defined as positive), H is a distance in a lens outer diameter direction from an optical axis, R is a paraxial radius of curvature, ε is the constant of the cone (EP), and A, B, C, D, E, F are second, fourth, sixth, eighth, tenth, and twelfth Aspheric coefficients, respectively. In addition, in Table 2, "E-a" indicates "λ10$^{-a}$".

In addition, Table 3 illustrates specifications of the imaging optical system. In Table 3, "F" is the focal length of the imaging optical system, "Fno" is an F-number of the imaging optical system, and "2w" is the viewing angle of the imaging optical system.

Furthermore, Table 28 illustrates numerical values of the conditional expression (1) through the conditional expression (7) of the imaging optical system respectively. Since matters regarding the respective tables are similar in the respective tables illustrated in the other examples, the description is omitted below.

In addition, FIG. 2 illustrates a longitudinal aberration diagram at the time of focusing at infinity of the imaging optical system. The spherical aberration (mm), the astigmatism (mm) and the distortion aberration (%) are illustrated in order from a left side facing the drawing.

In a spherical aberration diagram, a vertical axis indicates the F-number (indicated by FNO in the figure), a solid line is the performance on the d line (wavelength 587.56 nm), a long broken line is the performance on a C line (wavelength 656.27 nm), and a short broken line is the performance on an F line (wavelength 486.13 nm).

In an astigmatism diagram, a vertical axis indicates the image height (Y), a solid line is the performance on a sagittal image plane (S) to the d line (wavelength 587.56 nm), and a dotted line is the performance on a meridional image plane (T) to the d line.

In a distortion aberration diagram, a vertical axis indicates the image height (Y), and the performance on the d line (wavelength 587.56 nm) is indicated.

In addition, FIG. 3 illustrates lateral aberration diagrams at the time of focusing at infinity of the imaging optical system. The respective lateral aberration diagram illustrates the coma aberration at the time of 0.70FA and 0.00FA. Note that FA is the maximum image height. Further, in the respective lateral aberration diagrams, a horizontal axis indicates a distance from a main light beam on a pupil surface, a solid line indicates the d line (wavelength 587.56 nm), a long broken line indicates the C line (wavelength 656.27 nm), and a short broken line indicates the F line (wavelength 486.13 nm). Since the matters regarding the aberration diagrams are similar in the respective diagrams illustrated in the other examples, the description is omitted below.

In addition, in the imaging optical system in the example 1, the temperature coefficients (dn3, dn4) (unit: $10^{-6}$/K) of the relative refractive index at the temperature 20° C.-40° C. to the d line of the third lens and the fourth lens are as follows respectively.

dn3=−5.9
dn4=3.4

TABLE 1

| NS | R | D | Nd | Vd | |
|---|---|---|---|---|---|
| 1* | 13.657 | 1.740 | 1.8602 | 40.10 | |
| 2* | 3.671 | 1.201 | | | |
| 3 | −205.730 | 2.231 | 1.8902 | 40.14 | |
| 4 | −6.173 | 0.210 | | | |
| 5 | −4.656 | 2.870 | 1.4997 | 81.56 | |
| 6 | −4.229 | 0.200 | | | |
| 7 | INF | 0.300 | 1.5202 | 64.20 | |
| 8 | INF | 0.200 | | | |
| 9 | INF | 0.203 | | | (Aperture stop) |
| 10 | 4.327 | 2.021 | 1.7347 | 54.67 | |
| 11 | 9.237 | 0.489 | | | |
| 12 | −15.529 | 0.500 | 1.9433 | 18.90 | |
| 13 | 11.577 | 1.185 | | | |
| 14* | 4.229 | 3.050 | 1.4997 | 81.56 | |
| 15* | −50.000 | 1.284 | | | |

TABLE 2

| | 0 (EP) | 2 (A) | 4 (B) | 6 (C) | 8 (D) | 10 (E) |
|---|---|---|---|---|---|---|
| 1* | 1.0000 | 0.00000.E+00 | −6.45365E−03 | 2.99623E−05 | 4.26551E−05 | −2.54478E−06 |
| 2* | 1.0003 | 0.00000.E+00 | −1.02473E−02 | 3.79030E−04 | 1.66967E−04 | −3.66855E−05 |
| 14* | 0.9998 | 0.00000.E+00 | −4.69220E−03 | 2.22324E−05 | −3.98537E−05 | 4.88482E−06 |
| 15* | 1.0000 | 0.00000.E+00 | −6.43639E−03 | 2.55966E−04 | −1.14533E−05 | −1.11192E−06 |

TABLE 3

| F | 5.08 |
|---|---|
| Fno | 1.8 |
| 2w | 100° |

Example 2

(1) Construction of Optical System

FIG. 4 illustrates a lens construction at the time of focusing at infinity of the imaging optical system in the example 2 according to the present invention.

The imaging optical system in the example 2 is composed by arranging the front group G1, the stop (aperture stop) S, and the rear group G2 in order, and forms an object image on the image plane I of the image sensor. The front group is configured by the first lens which is the negative lens, the second lens which is the positive lens and the third lens which is the positive lens arranged closest to the stop S in order from the object side. In addition, the rear group is configured by the fourth lens which is the positive lens arranged closest to the stop S, the fifth lens which is the negative lens, and the sixth lens which is the positive lens in order from the object side, and the imaging optical system is practically configured by six lenses.

For the first lens, the surface on the object side is the convex surface and the aspherical surface that weakens the convex power with distance from the optical axis. In addition, for the second lens, the surface on the object side is the concave surface. Details of the surface shapes can be seen in Table 4 and Table 5.

(2) Typical Numerical Values

Next, the typical numerical values to which the specific numerical values of the imaging optical system are applied will be described. Table 4 illustrates the surface data of the imaging optical system, Table 5 illustrates the aspherical surface data, and Table 6 illustrates the element data of the imaging optical system. In addition, Table 28 illustrates the numerical values of the conditional expression (1) through the conditional expression (7) of the imaging optical system respectively.

In addition, FIG. 5 illustrates the longitudinal aberration diagram at the time of focusing at infinity of the imaging optical system, and FIG. 6 illustrates the lateral aberration diagram at the time of focusing at infinity of the imaging optical system.

In addition, in the imaging optical system in the example 2, the temperature coefficients (dn3, dn4) of the relative refractive index at the temperature 20° C.-40° C. to the d line of the third lens and the fourth lens are as follows respectively.

dn3=−0.7
dn4=3.4

TABLE 4

| NS | R | D | Nd | Vd | |
|---|---|---|---|---|---|
| 1* | 6.787 | 1.740 | 1.8602 | 40.10 | |
| 2* | 2.912 | 1.392 | | | |
| 3 | −50.448 | 2.595 | 1.8114 | 46.50 | |
| 4 | −5.635 | 0.100 | | | |
| 5 | −4.977 | 3.500 | 1.5972 | 67.00 | |
| 6 | −4.919 | 0.200 | | | |
| 7 | INF | 0.300 | 1.5202 | 64.20 | |
| 8 | INF | 0.200 | | | |
| 9 | INF | 0.200 | | | (Aperture stop) |
| 10 | 5.051 | 2.504 | 1.7347 | 54.67 | |
| 11 | 63.098 | 0.161 | | | |
| 12 | −28.219 | 0.500 | 1.9433 | 18.90 | |
| 13 | 9.335 | 1.167 | | | |
| 14* | 7.507 | 3.050 | 1.4997 | 81.56 | |
| 15* | −50.000 | 1.137 | | | |

TABLE 5

| | 0 (EP) | 2 (A) | 4 (B) | 6 (C) | 8 (D) | 10 (E) |
|---|---|---|---|---|---|---|
| 1* | 1.0000 | 0.00000.E+00 | −4.94580E−03 | −2.69182E−04 | 4.28220E−05 | −1.93541E−06 |
| 2* | 0.9923 | 0.00000.E+00 | −1.06863E−02 | −6.04014E−04 | 1.33549E−04 | −9.25373E−06 |
| 14* | 1.0000 | 0.00000.E+00 | −3.05737E−03 | −1.18909E−04 | 3.74533E−05 | −9.47207E−06 |
| 15* | 1.0000 | 0.00000.E+00 | −7.38002E−03 | 6.80730E−05 | 6.14196E−05 | −8.02456E−06 |

TABLE 6

| F | 5.08 |
|---|---|
| Fno | 1.8 |
| 2w | 100° |

Example 3

(1) Construction of Optical System

FIG. 7 illustrates a lens construction at the time of focusing at infinity of the imaging optical system in the example 3 according to the present invention.

The imaging optical system in the example 3 is composed by arranging the front group G1, the stop (aperture stop) S, and the rear group G2 in order, and forms an object image on the image plane I of the image sensor. The front group is configured by the first lens which is the negative lens, the second lens which is the positive lens and the third lens which is the positive lens arranged closest to the stop S in order from the object side. In addition, the rear group is configured by the fourth lens which is the positive lens arranged closest to the stop S, the fifth lens which is the negative lens, and the sixth lens which is the positive lens in order from the object side, and the imaging optical system is practically configured by six lenses.

For the first lens, the surface on the object side is the convex surface and the aspherical surface that weakens the convex power with distance from the optical axis. In addition, for the second lens, the surface on the object side is the concave surface. Details of the surface shapes can be seen in Table 7 and Table 8.

(2) Typical Numerical Values

Next, the typical numerical values to which the specific numerical values of the imaging optical system are applied will be described. Table 7 illustrates the surface data of the imaging optical system, Table 8 illustrates the aspherical surface data, and Table 9 illustrates the element data of the imaging optical system. In addition, Table 28 illustrates the numerical values of the conditional expression (1) through the conditional expression (7) of the imaging optical system respectively.

In addition, FIG. 8 illustrates the longitudinal aberration diagram at the time of focusing at infinity of the imaging optical system, and FIG. 9 illustrates the lateral aberration diagram at the time of focusing at infinity of the imaging optical system.

In addition, in the imaging optical system in the example 3, the temperature coefficients (dn3, dn4) of the relative refractive index at the temperature 20° C.-40° C. to the d line of the third lens and the fourth lens are as follows respectively.

dn3=−5.9
dn4=3.4

TABLE 7

| NS | R | D | Nd | Vd | |
|---|---|---|---|---|---|
| 1* | 6.970 | 1.740 | 1.8602 | 40.10 | |
| 2* | 3.007 | 1.443 | | | |
| 3 | −95.399 | 3.432 | 1.8902 | 40.14 | |
| 4 | −23.754 | 0.100 | | | |
| 5 | −14.859 | 3.500 | 1.4997 | 81.56 | |
| 6 | −4.795 | 0.200 | | | |
| 7 | INF | 0.300 | 1.5202 | 64.20 | |
| 8 | INF | 0.200 | | | |
| 9 | INF | 0.200 | | | (Aperture stop) |
| 10 | 4.975 | 3.089 | 1.7347 | 54.67 | |
| 11 | −426.331 | 0.564 | | | |
| 12 | −13.861 | 0.500 | 1.9433 | 18.90 | |
| 13 | 13.210 | 0.684 | | | |
| 14* | 8.853 | 3.050 | 1.4997 | 81.56 | |
| 15* | −50.000 | 1.167 | | | |

TABLE 8

| | 0 (EP) | 2 (A) | 4 (B) | 6 (C) | 8 (D) | 10 (E) |
|---|---|---|---|---|---|---|
| 1* | 1.0000 | 0.00000.E+00 | −4.01291E−03 | −2.64771E−04 | 3.79974E−05 | −1.65521E−06 |
| 2* | 0.9945 | 0.00000.E+00 | −8.26351E−03 | −7.36188E−04 | 1.62718E−04 | −1.36222E−05 |
| 14* | 1.0000 | 0.00000.E+00 | −4.94258E−03 | 4.84176E−05 | −1.70627E−05 | −8.82412E−06 |
| 15* | 1.0000 | 0.00000.E+00 | −8.99196E−03 | 3.24328E−04 | 2.21461E−05 | −6.00684E−06 |

TABLE 9

| F | 5.08 |
|---|---|
| Fno | 1.8 |
| 2w | 100° |

Example 4

(1) Construction of Optical System

FIG. 10 illustrates a lens construction at the time of focusing at infinity of the imaging optical system in the example 4 according to the present invention.

The imaging optical system in the example 4 is composed by arranging the front group G1, the stop (aperture stop) S, and the rear group G2 in order, and forms an object image on the image plane I of the image sensor. The front group is configured by the first lens which is the negative lens, the second lens which is the positive lens and the third lens which is the positive lens arranged closest to the stop S in order from the object side. In addition, the rear group is configured by the fourth lens which is the positive lens arranged closest to the stop S, the fifth lens which is the negative lens, and the sixth lens which is the positive lens in order from the object side, and the imaging optical system is practically configured by six lenses.

For the first lens, the surface on the object side is the convex surface and the aspherical surface that weakens the convex power with distance from the optical axis. In addition, for the second lens, the surface on the object side is the concave surface. Details of the surface shapes can be seen in Table 10 and Table 11.

(2) Typical Numerical Values

Next, the typical numerical values to which the specific numerical values of the imaging optical system are applied will be described. Table 10 illustrates the surface data of the imaging optical system, Table 11 illustrates the aspherical surface data, and Table 12 illustrates the element data of the imaging optical system. In addition, Table 28 illustrates the numerical values of the conditional expression (1) through the conditional expression (7) of the imaging optical system respectively.

In addition, FIG. 11 illustrates the longitudinal aberration diagram at the time of focusing at infinity of the imaging optical system, and FIG. 12 illustrates the lateral aberration diagram at the time of focusing at infinity of the imaging optical system.

In addition, in the imaging optical system in the example 4, the temperature coefficients (dn3, dn4) of the relative refractive index at the temperature 20° C.-40° C. to the d line of the third lens and the fourth lens are as follows respectively.

dn3=−5.9 dn4=3.4

TABLE 10

| NS | R | D | Nd | Vd | |
|---|---|---|---|---|---|
| 1* | 6.686 | 1.740 | 1.8602 | 40.10 | |
| 2* | 3.068 | 1.596 | | | |
| 3 | −15.882 | 3.311 | 1.8902 | 40.14 | |
| 4 | −6.043 | 0.134 | | | |
| 5 | −5.092 | 3.500 | 1.4997 | 81.56 | |
| 6 | −5.074 | 0.200 | | | |
| 7 | INF | 0.300 | 1.5202 | 64.20 | |
| 8 | INF | 0.200 | | | |
| 9 | INF | 0.200 | | | (Aperture stop) |
| 10 | 5.368 | 2.465 | 1.7347 | 54.67 | |
| 11 | −70.480 | 0.100 | | | |
| 12 | −25.443 | 0.500 | 1.9433 | 18.90 | |
| 13 | 11.515 | 1.728 | | | |
| 14* | 9.392 | 3.050 | 1.4997 | 81.56 | |
| 15* | −50.000 | 1.439 | | | |

TABLE 11

| | 0 (EP) | 2 (A) | 4 (B) | 6 (C) | 8 (D) | 10 (E) |
|---|---|---|---|---|---|---|
| 1* | 1.0001 | 0.00000.E+00 | −3.93802E−03 | −2.57553E−04 | 3.34767E−05 | −1.36904E−06 |
| 2* | 0.9950 | 0.00000.E+00 | −8.28597E−03 | −7.25313E−04 | 1.47341E−04 | −1.20663E−05 |
| 14* | 1.0000 | 0.00000.E+00 | −3.65451E−03 | 1.35044E−04 | −4.92061E−05 | 2.43433E−06 |
| 15* | 1.0000 | 0.00000.E+00 | −7.56626E−03 | 2.68306E−04 | 7.35749E−06 | −2.64098E−06 |

TABLE 12

| F | 5.08 |
|---|---|
| Fno | 1.8 |
| 2w | 100° |

Example 5

(1) Construction of Optical System

FIG. 13 illustrates a lens construction at the time of focusing at infinity of the imaging optical system in the example 5 according to the present invention.

The imaging optical system in the example 5 is composed by arranging the front group G1, the stop (aperture stop) S, and the rear group G2 in order, and forms an object image on the image plane I of the image sensor. The front group is configured by the first lens which is the negative lens, the second lens which is the positive lens and the third lens which is the positive lens arranged closest to the stop S in order from the object side. In addition, the rear group is configured by the fourth lens which is the positive lens arranged closest to the stop S, the fifth lens which is the negative lens, and the sixth lens which is the positive lens in order from the object side, and the imaging optical system is practically configured by six lenses.

For the first lens, the surface on the object side is the convex surface and the aspherical surface that weakens the convex power with distance from the optical axis. In addition, for the second lens, the surface on the object side is the concave surface. Details of the surface shapes can be seen in Table 13 and Table 14.

(2) Typical Numerical Values

Next, the typical numerical values to which the specific numerical values of the imaging optical system are applied will be described. Table 13 illustrates the surface data of the imaging optical system, Table 14 illustrates the aspherical surface data, and Table 15 illustrates the element data of the imaging optical system. In addition, Table 28 illustrates the numerical values of the conditional expression (1) through the conditional expression (7) of the imaging optical system respectively.

In addition, FIG. 14 illustrates the longitudinal aberration diagram at the time of focusing at infinity of the imaging optical system, and FIG. 15 illustrates the lateral aberration diagram at the time of focusing at infinity of the imaging optical system.

In addition, in the imaging optical system in the example 5, the temperature coefficients (dn3, dn4) of the relative refractive index at the temperature 20° C.-40° C. to the d line of the third lens and the fourth lens are as follows respectively.

dn3=−6.5
dn4=1.1

TABLE 13

| NS | R | D | Nd | Vd | |
|---|---|---|---|---|---|
| 1* | 21.530 | 1.740 | 1.8602 | 40.10 | |
| 2* | 3.712 | 1.419 | | | |
| 3 | −16.550 | 3.500 | 1.8902 | 40.14 | |
| 4 | −8.303 | 0.170 | | | |
| 5 | −5.898 | 3.500 | 1.5964 | 68.62 | |
| 6 | −5.419 | 0.282 | | | |
| 7 | INF | 0.300 | 1.5202 | 64.20 | |
| 8 | INF | 0.282 | | | |
| 9 | INF | 0.200 | | | (Aperture stop) |
| 10 | 4.882 | 2.239 | 1.6830 | 55.34 | |
| 11 | 8.754 | 0.692 | | | |
| 12 | 9.303 | 0.500 | 1.9433 | 18.90 | |
| 13 | 4.440 | 0.100 | | | |
| 14* | 3.329 | 3.050 | 1.4997 | 81.56 | |
| 15* | −50.000 | 3.261 | | | |

TABLE 14

| | 0 (EP) | 2 (A) | 4 (B) | 6 (C) | 8 (D) | 10 (E) |
|---|---|---|---|---|---|---|
| 1* | 1.0000 | 0.00000.E+00 | −1.47227E−03 | 6.16362E−06 | 4.04822E−06 | −1.86530E−07 |
| 2* | 1.0004 | 0.00000.E+00 | −7.94275E−04 | −3.88472E−05 | 1.19137E−05 | 5.41074E−06 |
| 14* | 0.9994 | 0.00000.E+00 | −2.10286E−03 | −7.18939E−05 | −2.68837E−05 | 3.57071E−06 |
| 15* | 1.0000 | 0.00000.E+00 | 4.38142E−03 | −1.17163E−04 | 1.11356E−04 | −1.27020E−05 |

TABLE 15

| F | 3.90 |
|---|---|
| Fno | 1.8 |
| 2w | 100° |

Example 6

(1) Construction of Optical System

FIG. 16 illustrates a lens construction at the time of focusing at infinity of the imaging optical system in the example 6 according to the present invention.

The imaging optical system in the example 6 is composed by arranging the front group G1, the stop (aperture stop) S, and the rear group G2 in order, and forms an object image on the image plane I of the image sensor. The front group is configured by the first lens which is the negative lens, the second lens which is the positive lens and the third lens which is the positive lens arranged closest to the stop S in order from the object side. In addition, the rear group is configured by the fourth lens which is the positive lens arranged closest to the stop S, the fifth lens which is the negative lens, and the sixth lens which is the positive lens in order from the object side, and the imaging optical system is practically configured by six lenses.

For the first lens, the surface on the object side is the convex surface and the aspherical surface that weakens the convex power with distance from the optical axis. In addition, for the second lens, the surface on the object side is the concave surface. Details of the surface shapes can be seen in Table 16 and Table 17.

(2) Typical Numerical Values

Next, the typical numerical values to which the specific numerical values of the imaging optical system are applied will be described. Table 16 illustrates the surface data of the imaging optical system, Table 17 illustrates the aspherical surface data, and Table 18 illustrates the element data of the imaging optical system. In addition, Table 28 illustrates the numerical values of the conditional expression (1) through the conditional expression (7) of the imaging optical system respectively.

In addition, FIG. 17 illustrates the longitudinal aberration diagram at the time of focusing at infinity of the imaging optical system, and FIG. 18 illustrates the lateral aberration diagram at the time of focusing at infinity of the imaging optical system.

In addition, in the imaging optical system in the example 6, the temperature coefficients (dn3, dn4) of the relative refractive index at the temperature 20° C.-40° C. to the d line of the third lens and the fourth lens are as follows respectively.

dn3=−6.5
dn4=−0.7

TABLE 16

| NS | R | D | Nd | Vd | |
|---|---|---|---|---|---|
| 1* | 9.509 | 1.740 | 1.8602 | 40.10 | |
| 2* | 3.031 | 1.446 | | | |
| 3 | −52.028 | 3.500 | 1.8902 | 40.14 | |
| 4 | −7.629 | 0.188 | | | |
| 5 | −5.552 | 3.500 | 1.5964 | 68.62 | |
| 6 | −5.235 | 0.381 | | | |
| 7 | INF | 0.300 | 1.5202 | 64.20 | |
| 8 | INF | 0.381 | | | |
| 9 | INF | 0.200 | | | (Aperture stop) |
| 10 | 4.655 | 2.905 | 1.5972 | 67.00 | |
| 11 | 192.574 | 0.100 | | | |
| 12 | −81.486 | 0.500 | 1.9433 | 18.90 | |
| 13 | 9.536 | 0.654 | | | |
| 14* | 6.822 | 3.050 | 1.4997 | 81.56 | |
| 15* | −50.000 | 2.152 | | | |

TABLE 17

|      | 0 (EP) | 2 (A)        | 4 (B)         | 6 (C)         | 8 (D)         | 10 (E)        |
|------|--------|--------------|---------------|---------------|---------------|---------------|
| 1*   | 1.0000 | 0.00000.E+00 | −4.25012E−03  | 1.37994E−05   | 1.32310E−05   | −6.92779E−07  |
| 2*   | 0.9960 | 0.00000.E+00 | −8.49553E−03  | 1.16551E−06   | −7.13923E−06  | 4.72384E−06   |
| 14*  | 1.0000 | 0.00000.E+00 | −3.05456E−03  | −7.22176E−05  | 1.22484E−05   | −7.51632E−06  |
| 15*  | 1.0000 | 0.00000.E+00 | −4.87813E−04  | −3.29962E−04  | 9.81833E−05   | −1.35595E−05  |

TABLE 18

| F   | 4.50 |
|-----|------|
| Fno | 1.8  |
| 2w  | 100° |

Example 7

(1) Construction of Optical System

FIG. 19 illustrates a lens construction at the time of focusing at infinity of the imaging optical system in the example 7 according to the present invention.

The imaging optical system in the example 7 is composed by arranging the front group G1, the stop (aperture stop) S, and the rear group G2 in order, and forms an object image on the image plane I of the image sensor. The front group is configured by the first lens which is the negative lens, the second lens which is the positive lens and the third lens which is the positive lens arranged closest to the stop S in order from the object side. In addition, the rear group is configured by the fourth lens which is the positive lens arranged closest to the stop S, the positive lens, the fifth lens which is the negative lens, and the sixth lens which is the positive lens in order from the object side, and the imaging optical system is practically configured by seven lenses. Note that the imaging optical system in the example 7 includes the positive lens between the fourth lens and the fifth lens, differently from the imaging optical systems in the example 1 through the example 6.

For the first lens, the surface on the object side is the convex surface and the aspherical surface that weakens the convex power with distance from the optical axis. In addition, for the second lens, the surface on the object side is the concave surface. Details of the surface shapes can be seen in Table 19 and Table 20.

(2) Typical Numerical Values

Next, the typical numerical values to which the specific numerical values of the imaging optical system are applied will be described. Table 19 illustrates the surface data of the imaging optical system, Table 20 illustrates the aspherical surface data, and Table 21 illustrates the element data of the imaging optical system. In addition, Table 28 illustrates the numerical values of the conditional expression (1) through the conditional expression (7) of the imaging optical system respectively.

In addition, FIG. 20 illustrates the longitudinal aberration diagram at the time of focusing at infinity of the imaging optical system, and FIG. 21 illustrates the lateral aberration diagram at the time of focusing at infinity of the imaging optical system.

In addition, in the imaging optical system in the example 7, the temperature coefficients (dn3, dn4) of the relative refractive index at the temperature 20° C.-40° C. to the d line of the third lens and the fourth lens are as follows respectively.

dn3=−5.1 dn4=1.3

TABLE 19

| NS  | R       | D     | Nd     | Vd    |                 |
|-----|---------|-------|--------|-------|-----------------|
| 1*  | 5.640   | 1.740 | 1.8602 | 40.10 |                 |
| 2*  | 3.098   | 1.556 |        |       |                 |
| 3   | −13.247 | 2.306 | 1.8902 | 40.14 |                 |
| 4   | −7.358  | 0.188 |        |       |                 |
| 5   | −5.514  | 3.500 | 1.5534 | 75.50 |                 |
| 6   | −5.075  | 0.200 |        |       |                 |
| 7   | INF     | 0.300 | 1.5202 | 64.20 |                 |
| 8   | INF     | 0.200 |        |       |                 |
| 9   | INF     | 0.200 |        |       | (Aperture stop) |
| 10* | 9.000   | 1.603 | 1.6229 | 49.81 |                 |
| 11* | 11.300  | 0.100 |        |       |                 |
| 12  | 6.963   | 2.400 | 1.7347 | 54.67 |                 |
| 13  | −21.644 | 0.100 |        |       |                 |
| 14  | −21.527 | 0.500 | 1.9433 | 18.90 |                 |
| 15  | 14.555  | 1.717 |        |       |                 |
| 16* | 8.696   | 3.050 | 1.4997 | 81.56 |                 |
| 17* | −50.000 | 1.337 |        |       |                 |

TABLE 20

|      | 0 (EP)  | 2 (A)        | 4 (B)         | 6 (C)         | 8 (D)         | 10 (E)        |
|------|---------|--------------|---------------|---------------|---------------|---------------|
| 1*   | 1.0000  | 0.00000.E+00 | −4.03086E−03  | −3.66975E−04  | 3.64113E−05   | −1.22005E−06  |
| 2*   | 0.9952  | 0.00000.E+00 | −9.02596E−03  | −1.03569E−03  | 2.15861E−04   | −2.02773E−05  |
| 10*  | 0.1831  | 0.00000.E+00 | −2.00653E−04  | 6.51269E−05   | −8.73532E−06  | 1.15832E−06   |
| 11*  | −6.5322 | 0.00000.E+00 | 3.08336E−04   | 1.96986E−04   | −3.71088E−05  | 4.12609E−06   |
| 16*  | 1.0000  | 0.00000.E+00 | −2.60523E−03  | 1.69409E−04   | −3.14939E−05  | 1.90125E−06   |
| 17*  | 1.0000  | 0.00000.E+00 | −1.13814E−02  | 8.37072E−04   | −4.48937E−05  | 1.29632E−06   |

TABLE 21

| F   | 5.08 |
|-----|------|
| Fno | 1.8  |
| 2w  | 100° |

Example 8

(1) Construction of Optical System

FIG. 22 illustrates a lens construction at the time of focusing at infinity of the imaging optical system in the example 8 according to the present invention.

The imaging optical system in the example 8 is composed by arranging the front group G1, the stop (aperture stop) S, and the rear group G2 in order, and forms an object image on the image plane I of the image sensor. The front group is configured by the first lens which is the negative lens, the negative lens, the second lens which is the positive lens and the third lens which is the positive lens arranged closest to the stop S in order from the object side. In addition, the rear group is configured by the fourth lens which is the positive lens arranged closest to the stop S, the fifth lens which is the negative lens, and the sixth lens which is the positive lens in order from the object side, and the imaging optical system is practically configured by seven lenses. Note that the imaging optical system in the example 8 includes the negative lens between the first lens and the second lens, differently from the imaging optical systems in the example 1 through the example 6.

For the first lens, the surface on the object side is the convex surface and the aspherical surface that weakens the convex power with distance from the optical axis. In addition, for the second lens, the surface on the object side is the concave surface. Details of the surface shapes can be seen in Table 22 and Table 23.

(2) Typical Numerical Values

Next, the typical numerical values to which the specific numerical values of the imaging optical system are applied will be described. Table 22 illustrates the surface data of the imaging optical system, Table 23 illustrates the aspherical surface data, and Table 24 illustrates the element data of the imaging optical system. In addition, Table 28 illustrates the numerical values of the conditional expression (1) through the conditional expression (7) of the imaging optical system respectively.

In addition, FIG. 23 illustrates the longitudinal aberration diagram at the time of focusing at infinity of the imaging optical system, and FIG. 24 illustrates the lateral aberration diagram at the time of focusing at infinity of the imaging optical system.

In addition, in the imaging optical system in the example 8, the temperature coefficients (dn3, dn4) of the relative refractive index at the temperature 20° C.-40° C. to the d line of the third lens and the fourth lens are as follows respectively.

dn3=−5.9
dn4=−0.7

TABLE 22

| NS | R | D | Nd | Vd | |
|---|---|---|---|---|---|
| 1* | 5.432 | 1.600 | 1.8602 | 40.10 | |
| 2* | 3.668 | 1.329 | | | |
| 3 | 10.350 | 0.600 | 1.8902 | 40.14 | |
| 4 | 2.774 | 1.378 | | | |
| 5 | −100.000 | 1.944 | 1.8902 | 40.14 | |
| 6 | −5.376 | 0.158 | | | |
| 7 | −4.195 | 3.219 | 1.4997 | 81.56 | |
| 8 | −4.115 | 1.127 | | | |
| 9 | INF | 0.300 | 1.5202 | 64.20 | |
| 10 | INF | 0.992 | | | |
| 11 | INF | 0.200 | | | (Aperture stop) |
| 12 | 5.258 | 2.138 | 1.5972 | 67.00 | |
| 13 | −10.526 | 0.200 | | | |
| 14 | −12.727 | 0.500 | 1.9433 | 18.90 | |
| 15 | 26.468 | 1.282 | | | |
| 16* | 5.465 | 3.050 | 1.4997 | 81.56 | |
| 17* | −50.000 | 0.965 | | | |

TABLE 23

| | 0 (EP) | 2 (A) | 4 (B) | 6 (C) | 8 (D) | 10 (E) |
|---|---|---|---|---|---|---|
| 1* | 0.9992 | 0.00000.E+00 | 1.04165E−03 | −9.43101E−05 | −3.63248E−06 | −4.72679E−08 |
| 2* | 0.9853 | 0.00000.E+00 | 2.53979E−03 | −3.46631E−04 | −7.90744E−05 | 6.39228E−06 |
| 16* | 1.0000 | 0.00000.E+00 | −9.78376E−04 | −3.81339E−04 | 7.13930E−05 | −1.36307E−05 |
| 17* | 1.0000 | 0.00000.E+00 | 1.26226E−02 | −1.98355E−03 | 3.41551E−04 | −3.95259E−05 |

TABLE 24

| F | 3.40 |
|---|---|
| Fno | 1.8 |
| 2w | 100° |

Example 9

(1) Construction of Optical System

FIG. 25 illustrates a lens construction at the time of focusing at infinity of the imaging optical system in the example 9 according to the present invention.

The imaging optical system in the example 9 is composed by arranging the front group G1, the stop (aperture stop) S, and the rear group G2 in order, and forms an object image on the image plane I of the image sensor. The front group is configured by the first lens which is the negative lens, the negative lens, the second lens which is the positive lens and the third lens which is the positive lens arranged closest to the stop S in order from the object side. In addition, the rear group is configured by the fourth lens which is the positive lens arranged closest to the stop S, the positive lens, the fifth lens which is the negative lens, and the sixth lens which is the positive lens in order from the object side, and the imaging optical system is practically configured by eight lenses. Note that the imaging optical system in the example 9 includes the negative lens between the first lens and the second lens, and includes the positive lens between the fourth lens and the fifth lens, differently from the imaging optical systems in the example 1 through the example 6.

For the first lens, the surface on the object side is the convex surface and the aspherical surface that weakens the convex power with distance from the optical axis. In addition, for the second lens, the surface on the object side is the concave surface. Details of the surface shapes can be seen in Table 25 and Table 26.

(2) Typical Numerical Values

Next, the typical numerical values to which the specific numerical values of the imaging optical system are applied will be described. Table 25 illustrates the surface data of the imaging optical system, Table 26 illustrates the aspherical surface data, and Table 27 illustrates the element data of the imaging optical system. In addition, Table 28 illustrates the numerical values of the conditional expression (1) through the conditional expression (7) of the imaging optical system respectively.

In addition, FIG. 26 illustrates the longitudinal aberration diagram at the time of focusing at infinity of the imaging optical system, and FIG. 27 illustrates the lateral aberration diagram at the time of focusing at infinity of the imaging optical system.

In addition, in the imaging optical system in the example 9, the temperature coefficients (dn3, dn4) of the relative refractive index at the temperature 20° C.-40° C. to the d line of the third lens and the fourth lens are as follows respectively.

dn3=−6.7
dn4=−0.7

TABLE 25

| NS | R | D | Nd | Vd | |
|---|---|---|---|---|---|
| 1* | 4.829 | 1.600 | 1.8602 | 40.10 | |
| 2* | 3.286 | 1.231 | | | |
| 3 | 9.688 | 0.600 | 1.8902 | 40.14 | |
| 4 | 4.077 | 1.038 | | | |
| 5 | −1225.422 | 2.500 | 2.1314 | 17.02 | |
| 6 | −51.772 | 0.100 | | | |
| 7 | −19.927 | 3.387 | 1.4389 | 95.10 | |
| 8 | −4.312 | 0.316 | | | |
| 9 | INF | 0.300 | 1.5202 | 64.20 | |
| 10 | INF | 0.311 | | | |
| 11 | INF | 0.200 | | | (Aperture stop) |
| 12* | 7.020 | 1.216 | 1.5957 | 67.02 | |
| 13* | −25.821 | 0.100 | | | |
| 14 | 5.614 | 1.728 | 1.6221 | 63.39 | |
| 15 | 6.735 | 0.100 | | | |
| 16 | 6.738 | 0.500 | 1.9433 | 18.90 | |
| 17 | 3.792 | 1.641 | | | |
| 18* | 7.895 | 3.050 | 1.4997 | 81.56 | |
| 19* | −50.000 | 0.800 | | | |

TABLE 26

| | 0 (EP) | 2 (A) | 4 (B) | 6 (C) | 8 (D) | 10 (E) |
|---|---|---|---|---|---|---|
| 1* | 0.9998 | 0.00000.E+00 | −2.19656E−03 | −6.18310E−05 | −1.31833E−05 | 1.07229E−06 |
| 2* | 0.9989 | 0.00000.E+00 | −4.07664E−03 | −1.15428E−04 | −7.37260E−05 | 1.05050E−05 |
| 12* | 4.3030 | 0.00000.E+00 | −1.89643E−03 | 3.90706E−05 | −1.49112E−05 | 7.04410E−07 |
| 13* | −0.4993 | 0.00000.E+00 | −5.39579E−04 | 2.06996E−04 | −3.13719E−05 | 2.65982E−06 |
| 18* | 1.0000 | 0.00000.E+00 | −7.13015E−04 | −4.40977E−07 | −1.31852E−05 | 9.15047E−07 |
| 19* | 1.0000 | 0.00000.E+00 | −7.52891E−03 | 3.18791E−04 | −1.77834E−05 | 7.24259E−07 |

TABLE 27

| F | 5.08 |
|---|---|
| Fno | 1.8 |
| 2w | 100° |

TABLE 28

| Conditional expression | Example 1 | Example 2 | Example 3 | Example 4 | Example 5 | Example 6 | Example 7 | Example 8 | Example 9 |
|---|---|---|---|---|---|---|---|---|---|
| (1) 0.2 < \|dn3/dn4\| < 9.6 | 1.73 | 0.21 | 1.73 | 1.73 | 5.91 | 9.28 | 3.92 | 8.42 | 9.57 |
| (2) 0.52 < y/f · sin(θ1) < 1.35 | 0.78 | 0.78 | 0.78 | 0.78 | 1.03 | 0.91 | 0.69 | 1.18 | 0.79 |
| (3) ν2 < 47 | 40.1 | 46.5 | 40.1 | 40.1 | 40.1 | 40.1 | 40.1 | 40.1 | 17.0 |
| (4) ν3 > 65 | 81.6 | 67.0 | 81.6 | 80.6 | 68.6 | 68.6 | 75.5 | 81.6 | 95.1 |
| (5) 0.15 < N2 − N3 | 0.38 | 0.21 | 0.38 | 0.38 | 0.29 | 0.29 | 0.33 | 0.38 | 0.67 |
| (6) 1.3 < \|f12/f\| < 9.5 | 1.4 | 1.5 | 6.8 | 1.9 | 4.0 | 2.2 | 2.7 | 1.9 | 9.4 |
| (7) 2.2 < \|f13/f\| < 8.9 | 5.6 | 5.9 | 2.5 | 8.6 | 7.7 | 6.8 | 5.2 | 8.8 | 2.3 |

INDUSTRIAL APPLICABILITY

According to the present invention, it is possible to provide a small-sized imaging optical system of a wide angle and high relative illumination, capable of maintaining a high resolution regardless of change of an atmospheric temperature, and an imaging apparatus.

What is claimed is:

1. An imaging optical system, comprising: a front group, a stop, and a rear group, in order, from an object side,
wherein a lens arranged closest to the stop in the front group is a positive lens comprising a concave surface disposed on the object side, and a convex surface disposed on an image side, wherein the front group further comprises at least one additional positive lens comprising a concave surface disposed on the object side, and a convex surface disposed on the image side, wherein a lens arranged closest to the stop in the rear group is a positive lens, and wherein a conditional expression (1) and a conditional expression (2) below are satisfied:

$$1.40 < |dn3/dn4| < 9.60 \tag{1}$$

$$0.52 < y/f \cdot \sin(\theta 1) < 1.35 \tag{2}$$

wherein
- dn3: a temperature coefficient of a relative refractive index at a temperature 20° C-40° C. to a d line of the positive lens arranged closest to the stop in the front group
- dn4: a temperature coefficient of a relative refractive index at the temperature 20° C.-40° C. to a d line of the positive lens arranged closest to the stop in the rear group
- f: a focal length of the imaging optical system
- y: a maximum image height of the imaging optical system, and
- θ1: a maximum half image viewing angle of the imaging optical system.

2. The imaging optical system according to claim 1, wherein the front group comprises a first lens on the object side of the positive lens arranged closest to the stop and the at least one additional positive lens, wherein the first lens is a negative lens, a surface of which on the object side is a convex surface and is also an aspherical surface that weakens convex power with distance from an optical axis, and is arranged more on the object side than the second lens.

3. The imaging optical system according to claim 1, wherein a conditional expression (3) and a condition expression (4) below are satisfied:

$$v2 < 47 \tag{3}$$

$$v3 > 65 \tag{4}$$

wherein
- v2: an Abbe constant of the positive lens of a smallest Abbe constant to the d line, among the positive lenses included in the front group, and
- v3: an Abbe constant of the positive lens of a largest Abbe constant to the d line, among the positive lenses included in the front group.

4. The imaging optical system according to claim 1, wherein a conditional expression (5) below is satisfied:

$$0.15 < N2-N3 \tag{5}$$

wherein
- N2: a refractive index of the positive lens of a largest refractive index to the d line, among the positive lenses included in the front group, and
- N3: a refractive index of the positive lens of a smallest refractive index to the d line, among the positive lenses included in the front group.

5. The imaging optical system according to claim 1, wherein the front group comprises a first lens, which is a negative lens, disposed on the object side of the positive lens arranged closest to the stop and the at least one additional positive lens wherein the rear group comprises a fourth lens, which is the positive lens arranged closest to the stop, a fifth lens, which is a negative lens, and a sixth lens, which is a positive lens in order from the object side, the imaging optical system being practically composed of the six lenses.

6. The imaging optical system according to claim 5, satisfying a conditional expression (6) below:

$$1.3 < |f12/f| < 9.5 \tag{6}$$

wherein
- f: the focal length of the imaging optical system, and
- f12: the focal length of the second lens.

7. The imaging optical system according to claim 5, satisfying a conditional expression (7) below:

$$2.2 < |f13/f| < 8.9 \tag{7}$$

wherein
- f: the focal length of the imaging optical system, and
- f13: the focal length of the third lens.

8. An imaging apparatus including an imaging optical system described in claim 1, and an image sensor that converts an optical image formed by the imaging optical system to an electric signal, on an image side of the imaging optical system.

* * * * *

UNITED STATES PATENT AND TRADEMARK OFFICE
CERTIFICATE OF CORRECTION

PATENT NO. : 10,721,398 B2
APPLICATION NO. : 15/838787
DATED : July 21, 2020
INVENTOR(S) : Koutarou Joujiki et al.

Page 1 of 1

It is certified that error appears in the above-identified patent and that said Letters Patent is hereby corrected as shown below:

In the Claims

Column 27, Line 9, Claim 1, delete "$1.40<\mathrm{dn3/dn4}<9.60$" and insert -- $1.40<|\mathrm{dn3/dn4}|<9.60$ --

Signed and Sealed this
First Day of December, 2020

Andrei Iancu
*Director of the United States Patent and Trademark Office*